(12) United States Patent
Kim et al.

(10) Patent No.: US 11,365,986 B2
(45) Date of Patent: Jun. 21, 2022

(54) SENSOR DEVICE FOR DETERMINING RELATIVE POSITION, ELECTRONIC DEVICE INCLUDING SAME AND METHOD FOR DETERMINING RELATIVE POSITION

(71) Applicant: Samsung Electronics Co., Ltd., Suwon-si (KR)

(72) Inventors: Junhyuk Kim, Suwon-si (KR); Hoyoung Jeong, Suwon-si (KR); Myunghoon Kwak, Suwon-si (KR); Jaedeok Lim, Suwon-si (KR); Gyuyeong Cho, Suwon-si (KR); Soyoung Lee, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/247,824

(22) Filed: Dec. 23, 2020

(65) Prior Publication Data

US 2022/0065660 A1   Mar. 3, 2022

(30) Foreign Application Priority Data

Sep. 1, 2020   (KR) .................. 10-2020-0110849

(51) Int. Cl.
*G01D 5/14* (2006.01)
*G06F 1/16* (2006.01)
*G01D 18/00* (2006.01)

(52) U.S. Cl.
CPC ........... *G01D 5/142* (2013.01); *G06F 1/1675* (2013.01); *G01D 18/00* (2013.01)

(58) Field of Classification Search
None
See application file for complete search history.

(56) References Cited

U.S. PATENT DOCUMENTS 7,248,037 B2 * 7/2007 Hara ...................... G01D 5/145
                                                  324/207.2
7,907,121 B2   3/2011 Jacobs et al.
(Continued)

FOREIGN PATENT DOCUMENTS

EP   3598724 A1   1/2020
JP   2009-193588 A   8/2009
(Continued)

OTHER PUBLICATIONS

Preliminary Examination Result dated Feb. 10, 2021 in connection with Korean Application No. 10-2020-0110849, 8 pages.
(Continued)

*Primary Examiner* — Nasima Monsur

(57) ABSTRACT

An electronic device includes a first part. The electronic device also includes a second part that is configured to move with respect to the first part. The electronic further device includes a magnetic member that is disposed on one of the first part and the second part. Additionally, the electronic device includes a sensor that is disposed on the other one of the first part and the second part and facing the magnetic member. The magnetic member includes a body extending in a movement direction of the second part and magnets respectively disposed at both ends of the magnetic member such that different polarities are close to each other.

16 Claims, 20 Drawing Sheets

(56) References Cited

U.S. PATENT DOCUMENTS

| | | | |
|---|---|---|---|
| 7,982,568 B2 | 7/2011 | Fullerton et al. | |
| 10,861,628 B2 | 12/2020 | Wang | |
| 2009/0029741 A1* | 1/2009 | Satou | H04M 1/0237 |
| | | | 455/566 |
| 2011/0248705 A1* | 10/2011 | Matsumoto | G01D 5/145 |
| | | | 324/207.2 |
| 2012/0154228 A1 | 6/2012 | Stoufer et al. | |
| 2015/0049209 A1* | 2/2015 | Hwang | G02B 27/646 |
| | | | 348/208.11 |
| 2015/0168722 A1 | 6/2015 | Cho et al. | |
| 2015/0204737 A1* | 7/2015 | Moran | G01L 1/122 |
| | | | 73/862.625 |
| 2019/0278337 A1 | 9/2019 | Hu et al. | |

FOREIGN PATENT DOCUMENTS

| | | |
|---|---|---|
| JP | 2020-516965 A | 6/2020 |
| KR | 10-2004-0082486 A | 9/2004 |
| KR | 10-2009-0022096 A | 3/2009 |
| KR | 10-2012-0095880 A | 8/2012 |
| KR | 10-2015-0071343 A | 6/2015 |

OTHER PUBLICATIONS

Decision of Patent dated Mar. 30, 2021 in connection with Korean Application No. 10-2020-0110849, 5 pages.

* cited by examiner

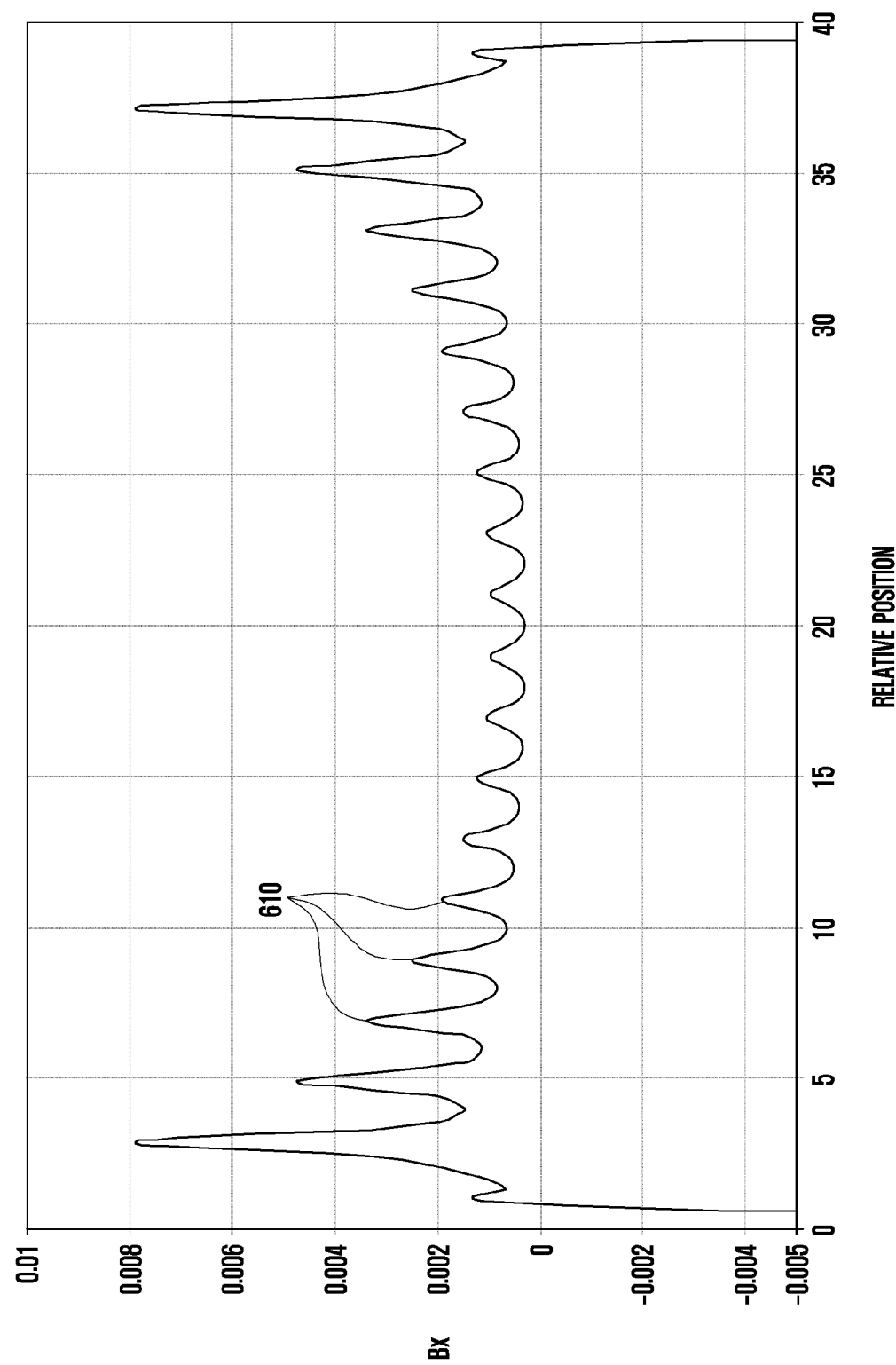

SENSOR DEVICE FOR DETERMINING RELATIVE POSITION, ELECTRONIC DEVICE INCLUDING SAME AND METHOD FOR DETERMINING RELATIVE POSITION

CROSS-REFERENCE TO RELATED APPLICATION

This application is based on and claims priority under 35 U.S.C. 119 to Korean Patent Application No. 10-2020-0110849, filed on Sep. 1, 2020, in the Korean Intellectual Property Office, the disclosure of which is herein incorporated by reference in its entirety.

BACKGROUND

1. Field

Various embodiments disclosed herein relate to a sensor device for determining a relative position, an electronic device including the sensor device, and a method for determining a relative position.

2. Description of Related Art

An electronic device may include parts capable of moving relative to each other, due to various requirements. Examples of such electronic devices may include an electronic device configured such that the display area of the display thereof is expanded by movement parts relative to each other, and an electronic device configured such that a component (for example, a physical keyboard or a camera module) is exposed to the outside by movement of parts relative to each other.

In order to apply an operation scenario while changing the same appropriately according to a relative movement in connection with an electronic device having parts configured to move relative to each other, it is necessary to determine a change in the relative position between the parts.

The above information is presented as background information only to assist with an understanding of the disclosure. No determination has been made, and no assertion is made, as to whether any of the above might be applicable as prior art with regard to the disclosure.

SUMMARY

A sensor may be used to determine a change in the relative position between parts. The sensor refers to a sensor based on the Hall effect. The sensor may measure a relative movement by measuring a change in the magnetic field resulting from the Hall effect.

A conventional sensor is configured to detect a magnetic field formed by magnets disposed at each predetermined distance. The value of a magnetic flux with regard to a relative position in such a disposition appears periodically repeated. The same magnetic flux value may be detected by the sensor in different positions. That is, the magnetic flux value detected by the sensor and the relative position do not match one to one. For this reason, it may be difficult to accurately determine the relative position solely by an instantaneously detected magnetic flux value.

Various embodiments disclosed herein may provide a sensor device for determining a relative position, an electronic device including the sensor device, and a method for determining a relative position, wherein a magnetic flux value can be linearly detected by a sensor such that the magnetic flux value and the relative position can be matched one to one.

An electronic device according to various embodiments disclosed herein may include: a first part; a second part configured to move with respect to the first part; a magnetic member disposed on one of the first part and the second part; and a sensor disposed on the other one of the first part and the second part and facing the magnetic member. The magnetic member may include a body extending in a movement direction of the second part and magnets respectively disposed at both ends of the magnetic member such that different polarities are close to each other.

A method for determining a relative position between parts according to various embodiments disclosed herein may include the operations of: detecting a magnetic flux value through a sensor disposed on one of a first part and a second part to face a magnetic member disposed on the other one of the first part and the second part; and determining a relative position of the second part to the first part using the detected magnetic flux value. The magnetic member may include a body extending in a movement direction of the second part and magnets respectively disposed at both ends of the magnetic member such that different polarities are close to each other.

A sensor device according to various embodiments disclosed herein may include: a magnetic member disposed on one of a first part and a second part configured to be movable with respect to the first part; and a sensor disposed on the other one of the first part and the second part and facing the magnetic member. The magnetic member may include a body extending in a movement direction of the second part and magnets respectively disposed at both ends of the magnetic member such that different polarities are close to each other.

Various embodiments disclosed herein are advantageous in that a magnetic flux value detected by a sensor and a relative position between parts are matched one to one, and the relative position between the parts thus can be determined from the magnetic flux value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

In the description of drawings, the same or similar components may be given the same or similar reference numerals.

FIG. 6 illustrates a graph showing magnetic flux that is detected by a sensor due to relative movement of the sensor to the magnetic member shown in FIG. 5;

DETAILED DESCRIPTION

Figure 1:
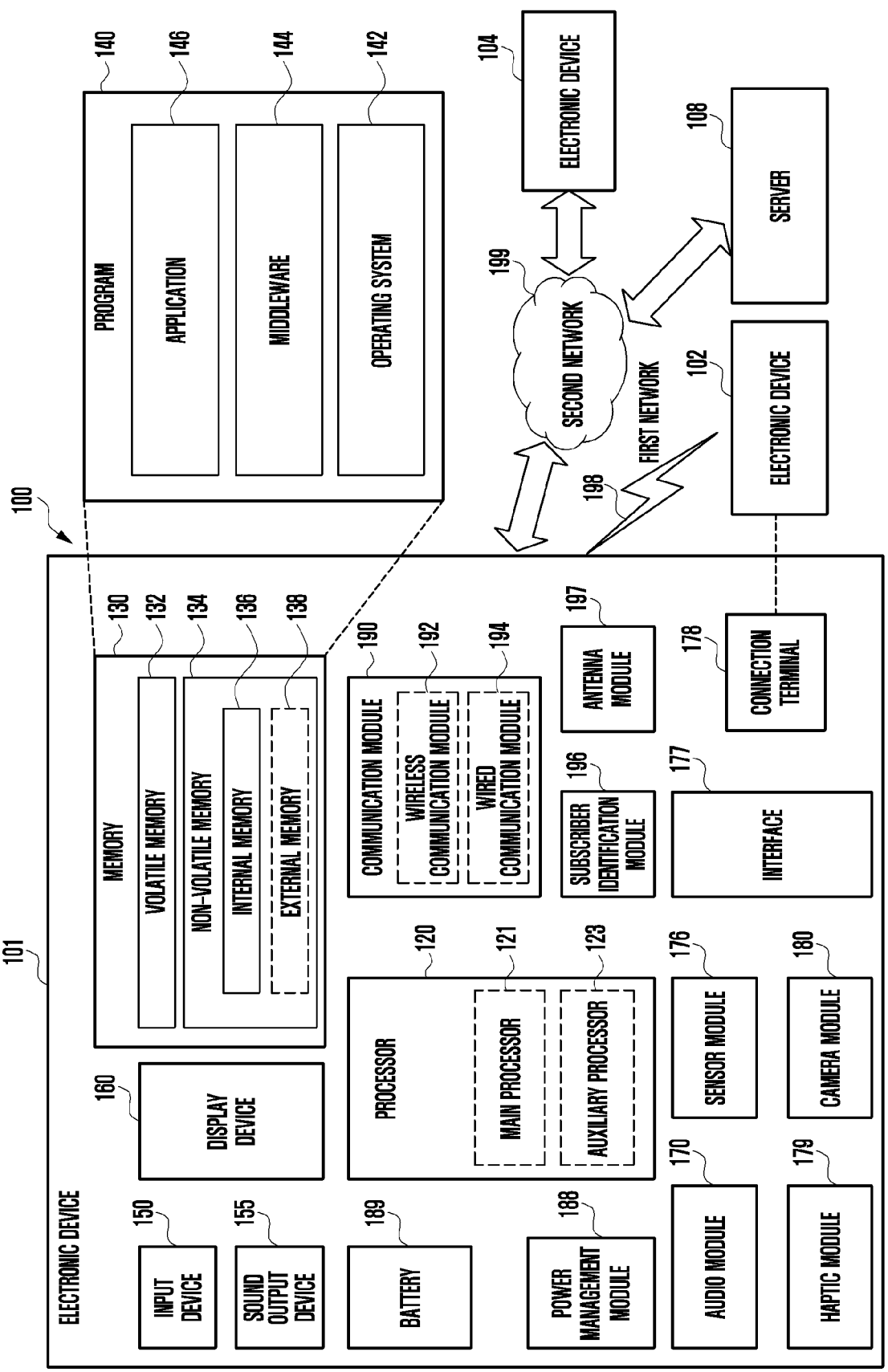
FIG. 1 illustrates a block diagram of an electronic device in a network environment according to various embodiments.

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
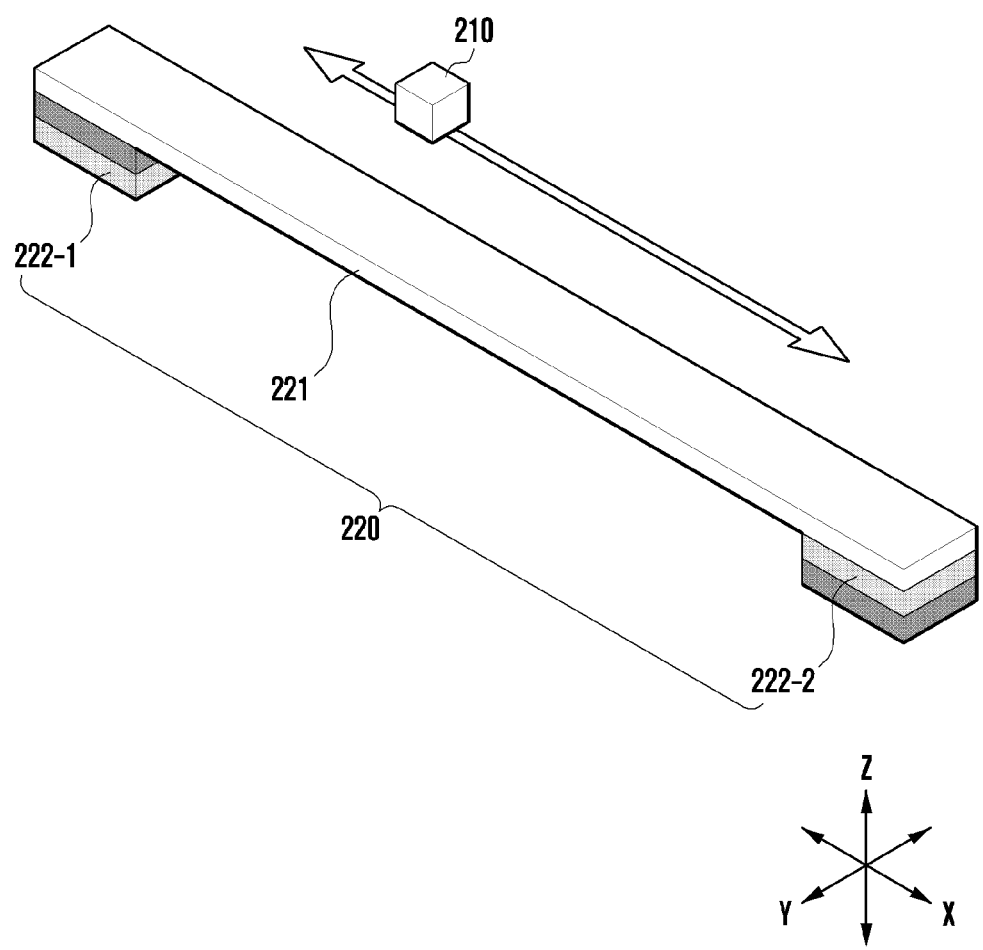
FIG. 2 illustrates a perspective view of a sensor and a magnetic member according to various embodiments.
Figure 3:
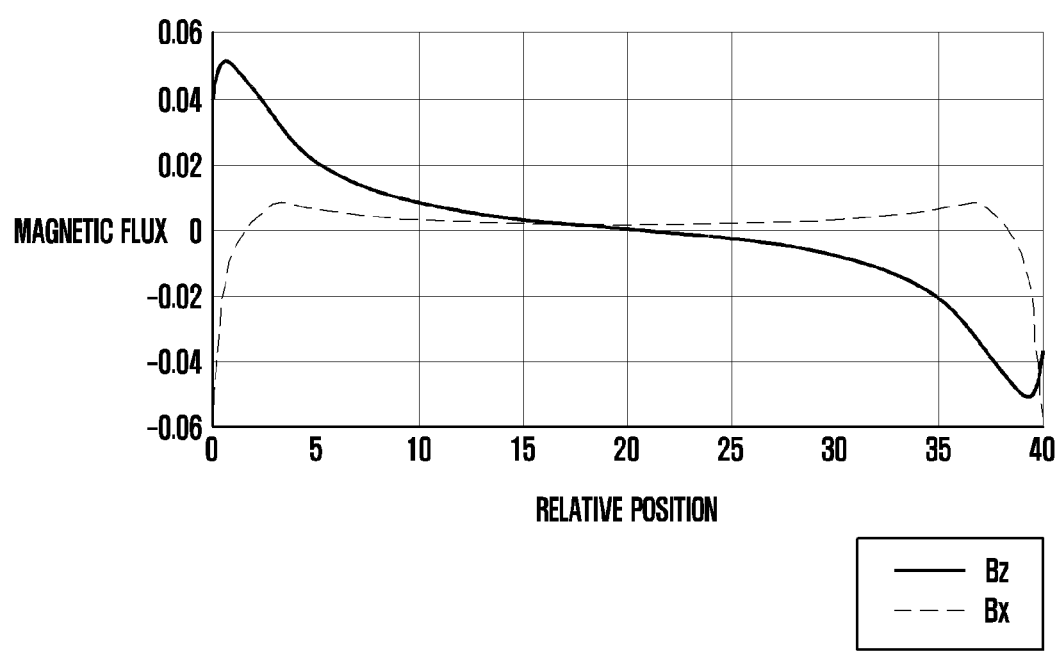
FIG. 3 illustrates a graph showing magnetic flux that is detected by the sensor in accordance with relative movement of the sensor and the magnetic member shown in FIG. 2.

FIG. 2 illustrates a perspective view of a sensor and a magnetic member according to various embodiments. FIG. 3 illustrates a graph showing magnetic flux that is detected by the sensor in accordance with relative movement of the sensor and the magnetic member shown in FIG. 2.

A sensor device according to various embodiments may include a magnetic member 220 and a sensor 210. The magnetic member 220 and the sensor 210 may be used to measure a position change of a part. For example, it is possible to measure a distance change between a first part and a second part moving with respect to the first part or measure the relative position of the second part to the first part, using the magnetic member 220 and the sensor 210. The first part and the second part may be the components of the electronic device shown in FIGS. 9 to 11. For example, the first part may be the first support member 1185 or the second support member 1125 shown in FIG. 11. The second part may be the third support member 1105 shown in FIG. 11.

According to various embodiments, the sensor 210 may be a sensor that detects a magnetic field. For example, the sensor 210 could be a Hall sensor. The sensor 210 may be a sensor that converts a magnetic field into an electrical signal using the Hall effect. Electrical charges moving in a magnetic field receive a force in a direction perpendicular to the direction of the magnetic field and the movement direction of the electrical charges. This force is referred to as Lorentz force. Electrical charges are concentrated in one direction in a magnetic field by Lorentz force, in which the electrical charge density is changed by the concentration, so a potential difference is generated. The Hall effect may refer to such a potential difference generated by concentration of electrical charges due to Lorentz force. The sensor 210 is a sensor that measures a potential difference that is generated by the Hall effect. The larger the intensity of a magnetic field, the larger the potential difference may be generated. That is, the intensity of a magnetic field is proportioned to a potential difference due to the Hall effect. The sensor 210 measures a current by the Hall effect, so it can detect the intensity of a magnetic field. In an embodiment, the sensor 210 can measure a magnetic field in a first direction, a magnetic field in a second direction perpendicular to the first direction, and a magnetic field in a third direction perpendicular to both of the first direction and the second direction. The first direction may be the X-axial direction in FIG. 2. The second direction may be the Y-axial direction in FIG. 2. The third direction may be the Z-axial direction in FIG. 2.

According to various embodiments, the magnetic member 220 can generate a magnetic field around the sensor 210. The magnetic member 220 may be disposed at a position facing the sensor 210. For example, when the sensor 210 is disposed on a first part, the magnetic member 220 may be disposed on a second part, which moves with respect to the first part, at a position facing the sensor 210. When sensor 210 is disposed on a second part, the magnetic member 220 may be disposed on a first part at a position facing the sensor 210.

As shown in FIG. 2, the magnetic member 220 may have a body 221 longitudinally elongated, and a first magnet 222-1 and a second magnet 222-2 respectively disposed at both ends of the body 221. The elongation direction of the magnetic member 220 may be the same as the movement direction of the second part relative to the first part. For example, as shown in FIG. 2, when the sensor 210 moves in the first direction (X-axial direction), the body 221 may be elongated in the first direction. In an embodiment, the body 221 may be a magnetic substance that is magnetized by magnetism. For example, the body 221 may be metal having magnetism. The first magnet 222-1 and the second magnet 222-2 respectively disposed at both ends of the body 221 may have different polarities at the portions adjacent to the body 221. For example, referring to FIG. 2, the first magnet 222-1 disposed at the left end of the body 221 may have the N-pole adjacent to the body 221 and the second magnet 222-2 disposed at the right end of the body 221 may have the S-pole adjacent to the body 221. As another example, referring to FIG. 2, the first magnet 222-1 disposed at the left end of the body 221 may have the S-pole adjacent to the body 221 and the second magnet 222-2 disposed at the right end of the body 221 may have the N-pole adjacent to the body 221. The poles of the first magnet 222-1 and the second magnet 222-2 are shown in different types for the convenience of description in FIG. 2.

According to various embodiments, the first magnet 222-1 and the second magnet 222-2 may be spaced apart from the right end and/or the left end of the body 221. For example, the first magnet 222-1 may be spaced apart within a predetermined distance (e.g., 0.5 cm) from the right end of the body 221 and the second magnet 222-2 may be spaced apart within a predetermined distance (e.g., 0.5 cm) from the left end of the body 221. The distances from the right end and/or the left end may depend on the length of the body 221 and/or the size of the first magnet 222-1 and the second magnet 222-2.

According to various embodiments, the body 221 that is a magnetic substance can be magnetized by the first magnet 222-1 and the second magnet 222-2 disposed at both ends of the body 221. Since the first magnet 222-1 and the second magnet 222-2 are disposed with different polarities adjacent to both ends of the body 221, respectively, both ends of the body 221 may be magnetized to have different polarities at the portions adjacent to the body 221. Both ends of the body 221 can be magnetized to have polarities respectively the same as polarities of the first magnet 222-1 and the second magnet 222-2 that are adjacent to the ends. For example, referring to FIG. 2, when the N-pole of the first magnet 222-1 disposed at the left end of the body 221 is adjacent to the body 221, the left end of the body 221 can be magnetized into the N-pole. Since both ends of the body 221 are magnetized into different polarities, the line of magnetic force may be formed from the N-pole to the S-pole in the body 221. In the body 221, both ends that are adjacent to the first magnet 222-1 and the second magnet 222-2 are the most intensively magnetized, and the closer to the center portion, the lower the degree of magnetization may be. The density (flux) of the line of magnetic force induced in the body 221 may depend on the degree of magnetization of the body 221. The degree of magnetization may be proportioned to the magnetic flux induced in the body 221. The magnetic flux induced at both ends of the body 221 may be the most intense, and the closer to the center portion of the body 221, the weaker the magnetic flux may be. The magnitude of magnetic flux is proportioned to the intensity of a magnetic field.

According to various embodiments, the body 221 may have structures for fixing the first magnet 222-1 and the second magnet 222-2. For example, side walls (not shown) extending from the body 221 may be further formed on both side surfaces of the body 221 (e.g., at both ends of the body 221 in the Y-axial direction and the −Y-axial direction). The first magnet 222-1 and the second magnet 222-2 may be fixed between the side walls (not shown) extending from both side surfaces of the body 221.

As shown in FIG. 2, the sensor 210 and the magnetic member 220 can be relatively moved by relative movement of a first part and a second part. The sensor 210 can detect the intensity of the magnetic field that is generated by the magnetic member 220. The sensor 210 can detect the magnitude of magnetic flux that is a physical quantity that is proportioned to the intensity of a magnetic field. As described above, the closer to the center portion from both ends of the body 221, the lower the magnitude of the induced magnetic flux may be. Since both ends of the body 221 are magnetized into different polarities, the directions of the induced magnetic flux may be opposite to each other. When the sensor 210 and the magnetic member 220 move with respect to each other, the value of magnetic flux detected by the sensor 210 may be shown as in FIG. 3. Referring to FIG. 3, the value of magnetic flux induced in the third direction (Z-axial direction) in FIG. 2 may be linear. The relative position of the sensor 210 and the magnetic member 220 and the value of the magnetic flux detected by the sensor 210 may be matched one to one. As the sensor 210 moves close to the center portion of the magnetic member 220 from an end of the magnetic member 220, the value of the magnetic flux may go close to 0.

According to various embodiments, the value of magnetic flux detected by the sensor 210 may be recognized as a positive value or a negative value, depending on the direction of the magnetic flux that is induced in the body 221. Since both ends of the body 221 are magnetized into different polarities, the directions of the magnetic flux induced at both ends of the body 221 may be opposite to each other. The value of magnetic flux that is detected when the sensor 210 is close to one end of the body 221 may be a positive value and the value of magnetic flux that is detected when the sensor 210 is close to the opposite end of the body 221 may be a negative value. Accordingly, it is possible to determine which one of both ends of the body 221 the sensor 210 is closer to in accordance with whether the value of magnetic flux detected by the sensor 210 is a positive number or a negative number.

Referring to FIG. 2, when the sensor 210 moves from a position close to one end of the body 221 to the opposite end of the body 221, the value of magnetic flux detected by the sensor 210 may gradually decrease from a positive value to 0 and then further increase into a negative value. While the sensor 210 moves along the body 221 and the relative position of the sensor 210 and the body 221 changes, the value of magnetic flux detected by the sensor 210 may linearly change. Since the relative position of the sensor 210 and the body 221 and the magnetic flux detected at the relative position are matched one to one, it is possible to measure the relative position of a first part and a second part according to predetermined magnetic flux. For example, it is possible to measure the relative position of a first part and a second part by storing the values of magnetic flux according to the relative position of a first part and a second part in the form of a table or a graph and by identifying the magnetic flux detected by the sensor 210 from the stored table.

According to various embodiments, a processor, which is operatively connected with the sensor 210, of an electronic device can detect the relative position of a second part to a first part using the magnetic flux value detected by the sensor 210. Magnetic flux values according to the relative position of the second part to the first part may be stored in the form of a table or a graph in a memory of the electronic device. The processor can determine the relative position of the second part to the first part by comparing the magnetic flux value detected by the sensor 210 with the magnetic values stored in the memory and identifying the relative position of the second part to the first part according to the magnetic value.

According to various embodiments, the magnetic member 220 may have a body 221 longitudinally elongated, and at least one magnet (e.g., a first magnet 222-1 and/or a second magnet 222-2) disposed on the body 221. For example, the body 221 may be one magnet (e.g., a first magnet 222-1 and/or a second magnet 222-2) and may have an N-pole and an S-pole respectively formed at both longitudinal (e.g., X-directional) ends. As another example, the body 221 may have one magnet (e.g., a first magnet 222-1 and/or a second magnet 222-2) at a longitudinal (e.g., X-directional) end.

FIGS. 4A to 4E illustrate perspective views showing magnetic members according to various embodiments. Components the same as or similar to those shown in FIG. 2 are given the same reference numerals.

Figure 4A:
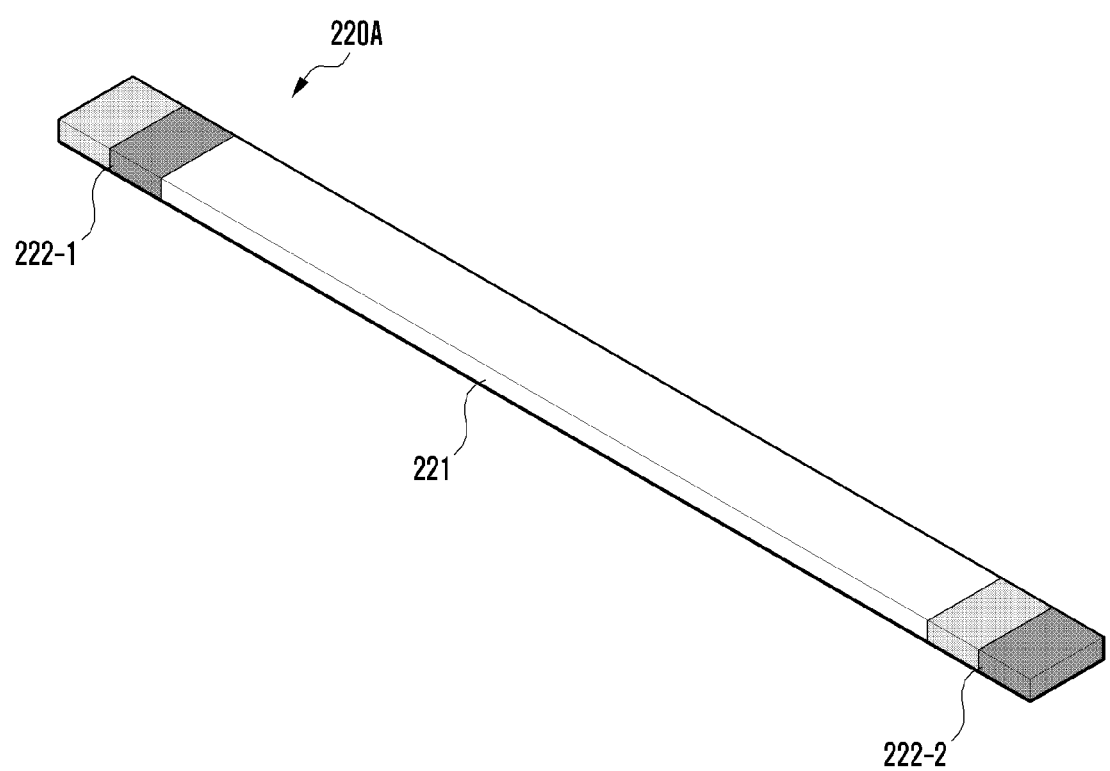
FIGS. 4A to 4E illustrate perspective views showing magnetic members according to various embodiments.
Figure 4B:
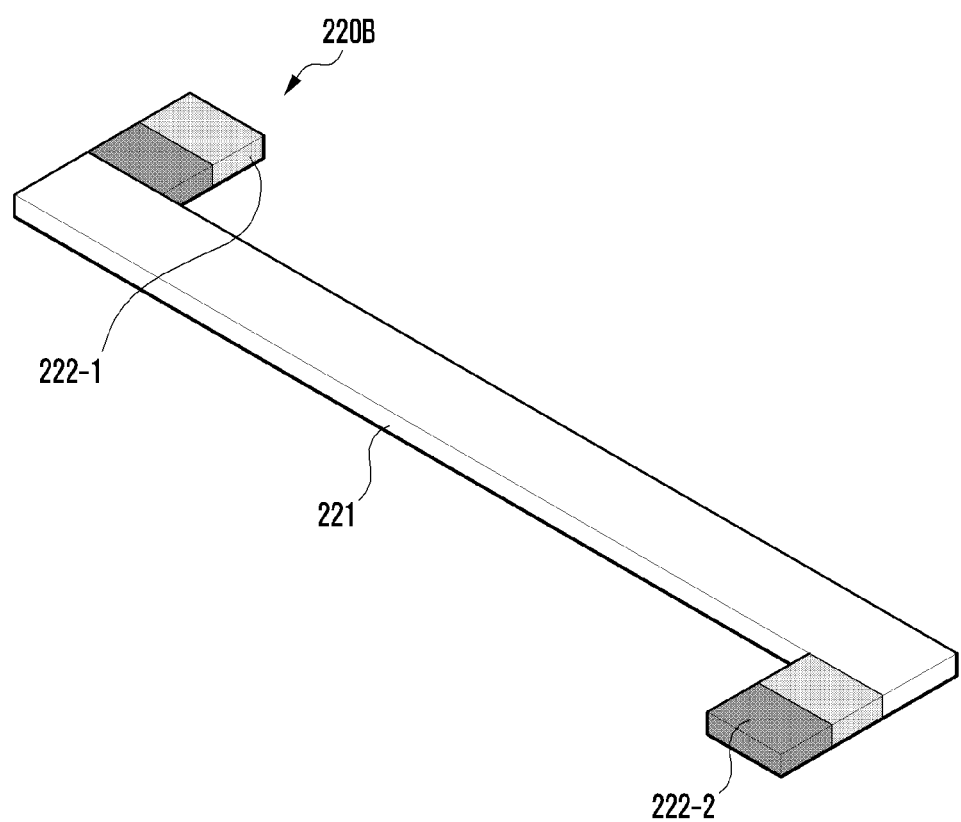
Figure 4C:
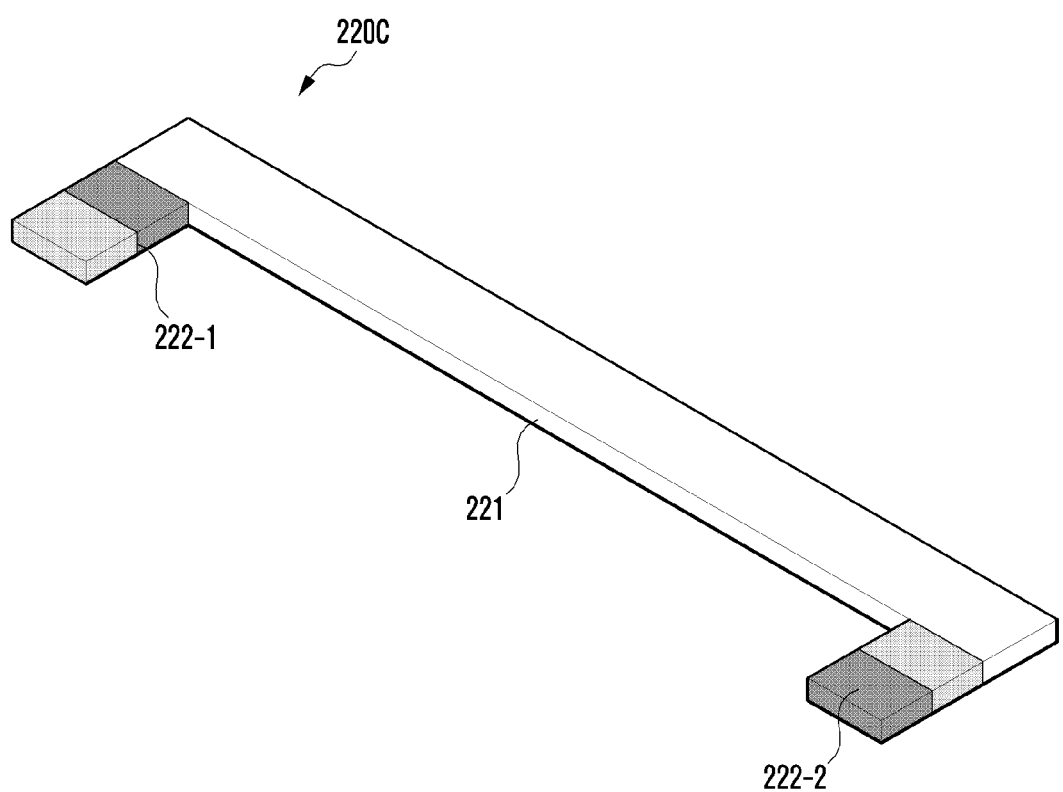

According to various embodiments, a body 221, a first magnet 222-1, and a second magnet 222-2 may be disposed in various ways in a magnetic member 220. For example, as shown in FIGS. 4A and 4B, in magnetic members 220A and 220B, a first magnet 222-1 and a second magnet 222-2 may be disposed on different surfaces of the body 221. As another example, as shown in FIG. 4C, in a magnetic member 220C, a first magnet 222-1 and a second magnet 222-2 may be disposed on the same surface of the body 221. The body 221, the first magnet 222-1, and the second magnet 222-2 may be disposed in various ways, as shown in FIGS. 4A to 4C, in consideration of relative disposition to other parts or electronic components disposed in an electronic device.

Figure 4D:
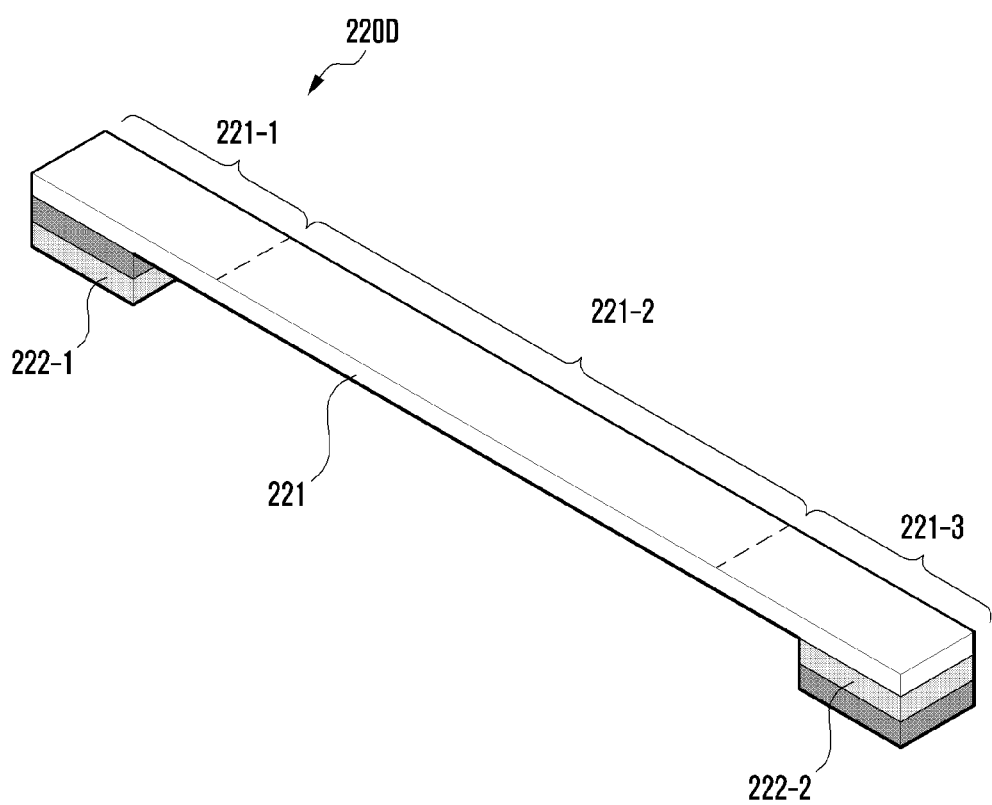

According to various embodiments, as shown in FIG. 4D, the body 221 may be divided into a first section 221-1 adjacent to both ends where the first magnet 222-1 and the second magnet 222-2 are disposed, and a second section 221-2 excluding the first section 221-1. The first section 221-1 and the second section 221-2 of the body 221 may be made of different materials. Referring to FIG. 3 described above, the change of the magnitude of magnetic flux at both ends of the body 221 close to the first magnet 222-1 and the second magnet 222-2 may be larger than the change of the magnitude of magnetic flux at the center portion of the body 221 spaced apart from the first magnet 222-1 and the second magnet 222-2. In an embodiments, the first section 221-1 and the second section 221-2 may be made of different materials such that the magnetic permeability of the material of the first section 221-1 of the body 221 is lower than the magnetic permeability of the material of the second section 221-2 of the body 221. When a material has lower magnetic permeability, the magnitude of induced magnetic flux may be small. When the first section 221-1 is made of a material with low magnetic permeability, the magnitude of magnetic flux that is induced in the first section 221-1 may be small. On the contrary, when the second section 221-2 is made of a material with high magnetic permeability, the magnitude of magnetic flux that is induced in the second section 221-2 may be large. Magnetic flux smaller than the minimum sensitivity of the sensor 210 may not be detected by the sensor 210. It is possible to adjust magnetic flux such that magnetic flux higher than the minimum sensitivity of the sensor 210 is maintained by using a material with high magnetic permeability for the second section 221-2 to increase the magnitude of the magnetic flux that is induced in the second section 221-2. Further, it is possible to attenuate a rapid change of the magnetic flux in the first section 221-1 by using a material with low magnetic permeability for the first section 221-1 to decrease the magnitude of the magnetic flux that is induced in the first section 221-1.

Figure 4E:
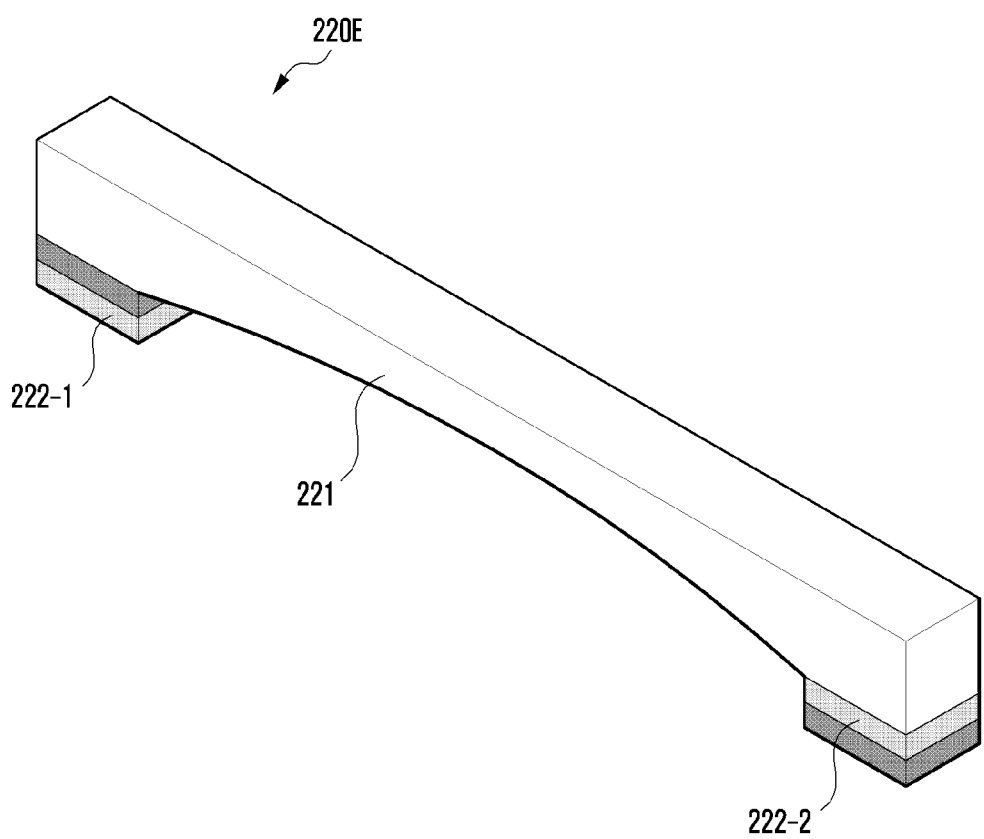

According to various embodiments, as shown in FIG. 4E, the thickness of the center portion of the body 221 and the thickness of both ends of the body 221 may be made different. For example, the thickness of the center portion of the body 221 may be smaller than the thickness of both ends of the body 221. As another example, as shown in FIG. 4E, the thickness may be decreased toward the center portion of the body 221. This configuration may be determined in consideration of the saturation magnetic flux density of the body 221. When the center portion of the body 221 is thin, magnetic flux is more easily saturated at the center portion, so the magnitude of the magnetic flux induced at the center portion may increase. By making the center portion of the body 221 thin such that the magnitude of the magnetic flux induced at the center portion increases, it is possible to adjust magnetic flux such that magnetic flux higher than the minimum sensitivity of the sensor 210 is maintained.

According to various embodiments, one end (e.g., the end close to the first magnet 222-1) of the body 221 may be thicker than the opposite end (e.g., the end close to the second magnet 222-2). For example, the thickness may be decreased as it goes from one end (e.g., the end close to the first magnet 222-1) of the body 221 to the opposite end (e.g., the end close to the second magnet 222-2).

Figure 5:
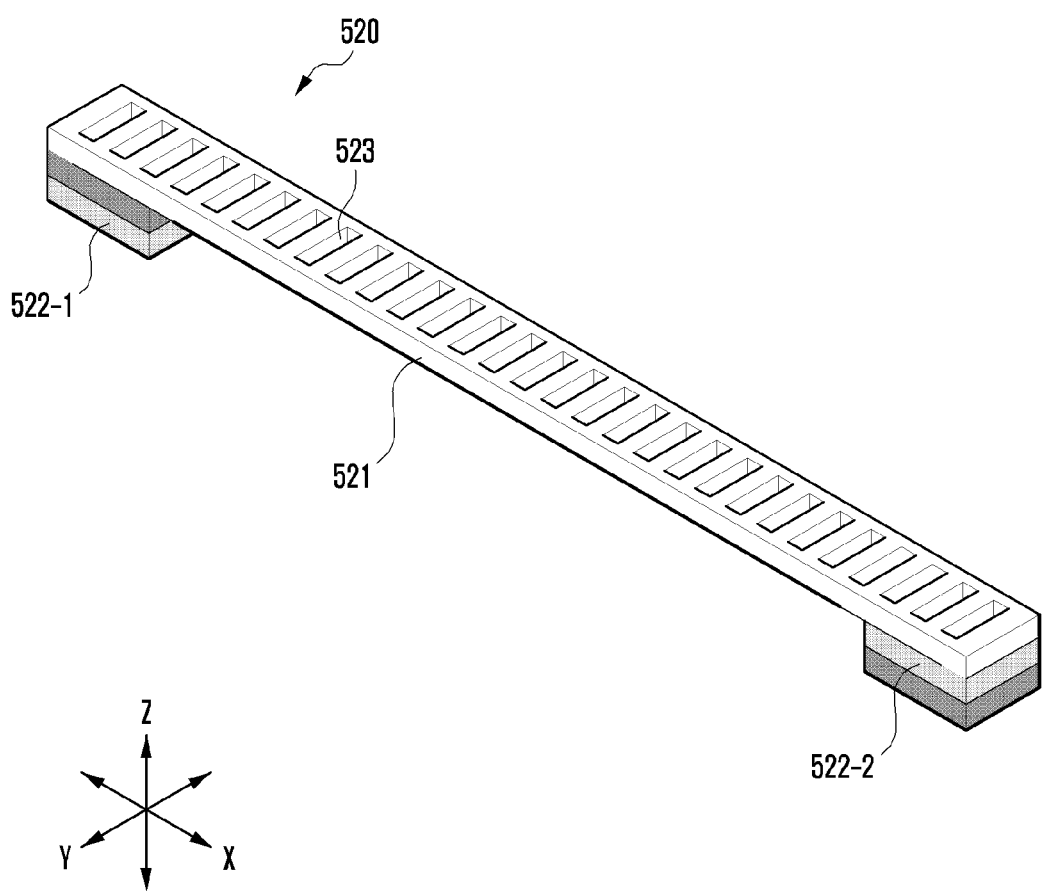
FIG. 5 illustrates a perspective view of a magnetic member having a plurality of slits according to various embodiments.

FIG. 5 illustrates a perspective view of a magnetic member having a plurality of slits according to various embodiments. FIG. 6 illustrates a graph showing a magnetic flux that is detected by a sensor due to relative movement of the sensor to the magnetic member shown in FIG. 5.

According to various embodiments, as shown in FIG. 5, a body 521 may have a plurality of openings, that is, slits 523 formed with predetermined intervals in the longitudinal direction of the body 521. A first magnet 522-1 and a second magnet 522-2 may be respectively disposed at both ends of the body 521. When the relative position of a magnetic member 520 having this type of body 521 and a sensor (e.g., the sensor 210 shown in FIG. 2) is changed, a change of magnetic flux detected by the sensor 210 may be shown like the graph of FIG. 6.

According to various embodiments, since the magnitude of the magnetic flux induced at the slits 523 of the body 521 is larger than the magnitude of the magnetic flux induced at the other portions excluding the slits 523, a plurality of peaks 610 may be included in the graph of the change of the magnetic flux value detected by the sensor 210. The change of the magnetic flux value is the change of the magnetic flux value (hereafter, referred to "Bx") in a direction (e.g., the X-direction in FIG. 5) parallel with the longitudinal direction of the body 521. Even though the slits 523 are formed in the body 521, the change of the magnetic flux value (hereafter, referred to as "Bz") in a direction (e.g., the Z-direction in FIG. 5) perpendicular to the longitudinal direction of the body 521 may be linearly shown, as shown in FIG. 3 described above. Since the gaps between the slits 523 are determined in advance, when a Bx change between a specific peak 610 and the next peak 610 is output from the sensor 210, the relative position between a first part and a second part may change by the gap between the slits 523. It may be possible to determine a relative position change between a first part and a second part using the number of peaks 610 detected by the sensor 210 in the same principle.

According to various embodiments, it may be possible to perform calibration using the body 521 having the slits 523. A processor of an electronic device may store a change of a magnetic flux value when the relative position of a second part to a first part changes in a memory. A magnetic flux value detected by the sensor 210 may exceed the range of the stored magnetic flux value due to various factors. The difference between a change of a magnetic flux value detected by the sensor 210 and a change of the stored magnetic flux value may exceed a configured normal range. In this case, calibration may be required. Even if a magnetic flux value detected through the sensor 210 is changed by an external factor, the gap of peaks 610 included in the Bx change may correspond to the gap of the slits 523 formed in the body 521. It is possible to determine the relative position of a first part and a second part by recognizing the peaks 610 included in the Bx change detected through the sensor 210 while the second part is moved with respect to the first part. It is possible to perform calibration by determining the relative position of the first part and the second part, using the Bx change, and then matching the relative position with the Bx change.

Figure 7A:
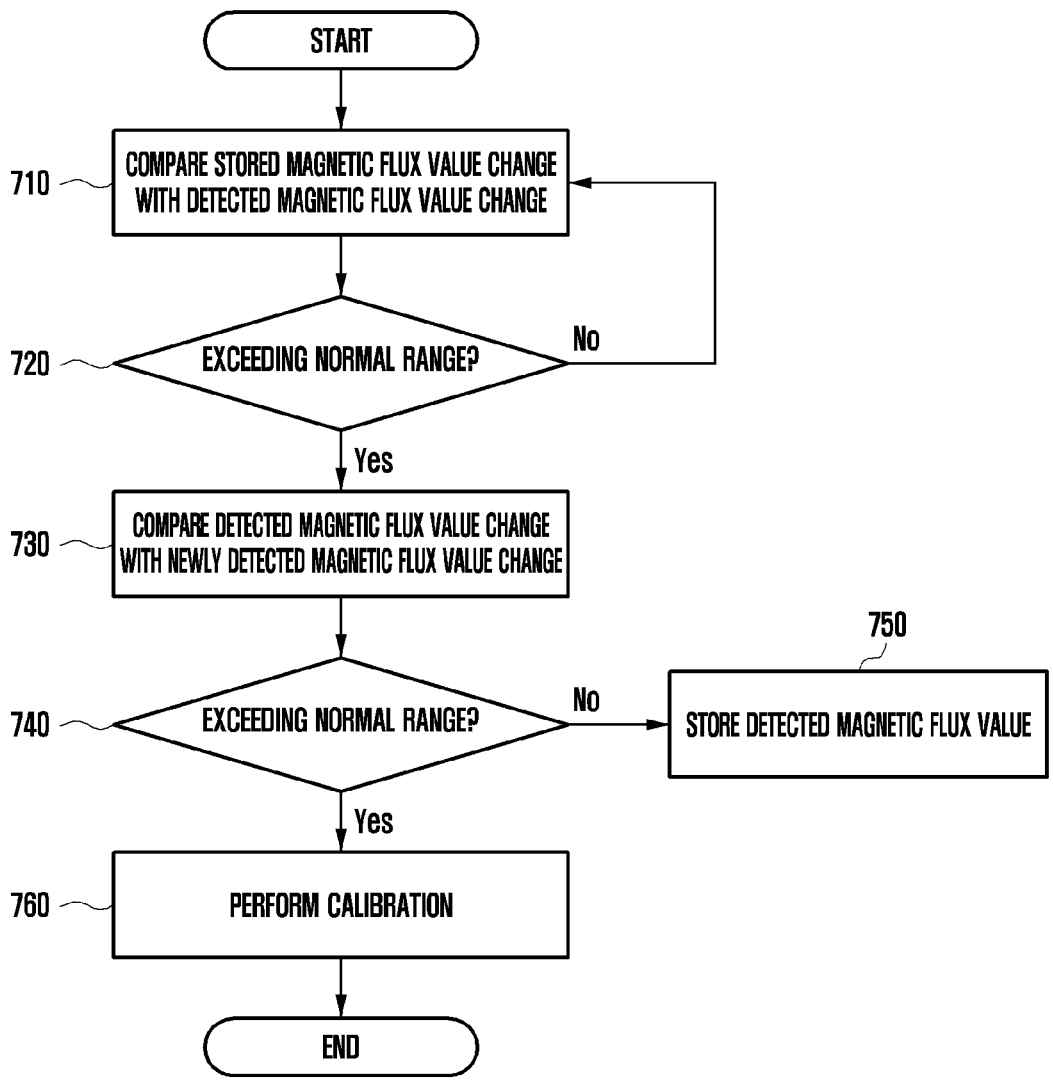
FIG. 7A illustrates a flowchart of calibration of a sensor and a magnetic member according to various embodiments.
Figure 7B:
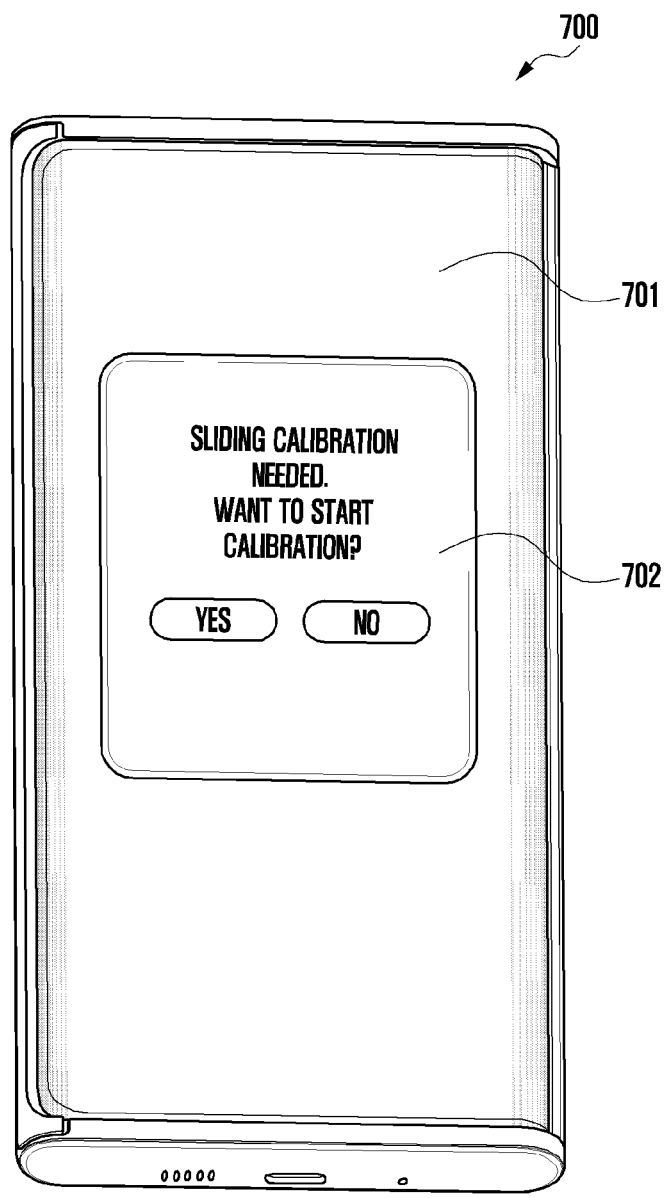
FIGS. 7B to 7D illustrate views showing a User Interface (UI) for calibration according to various embodiments.
Figure 7C:
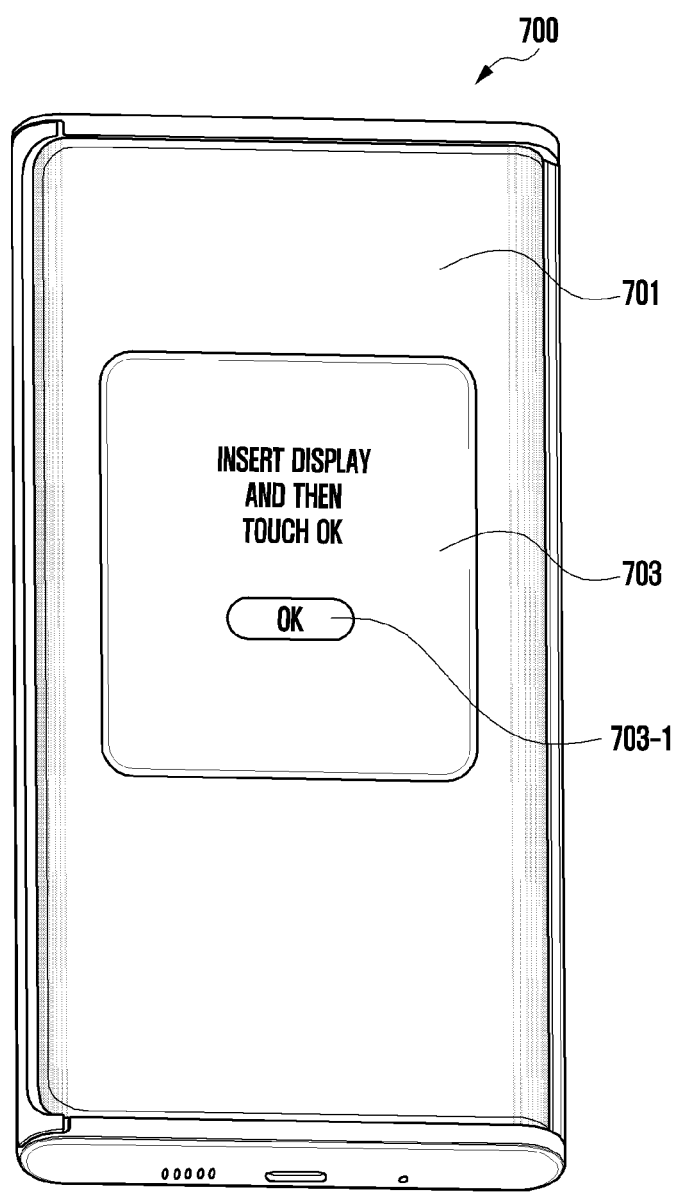
Figure 7D:
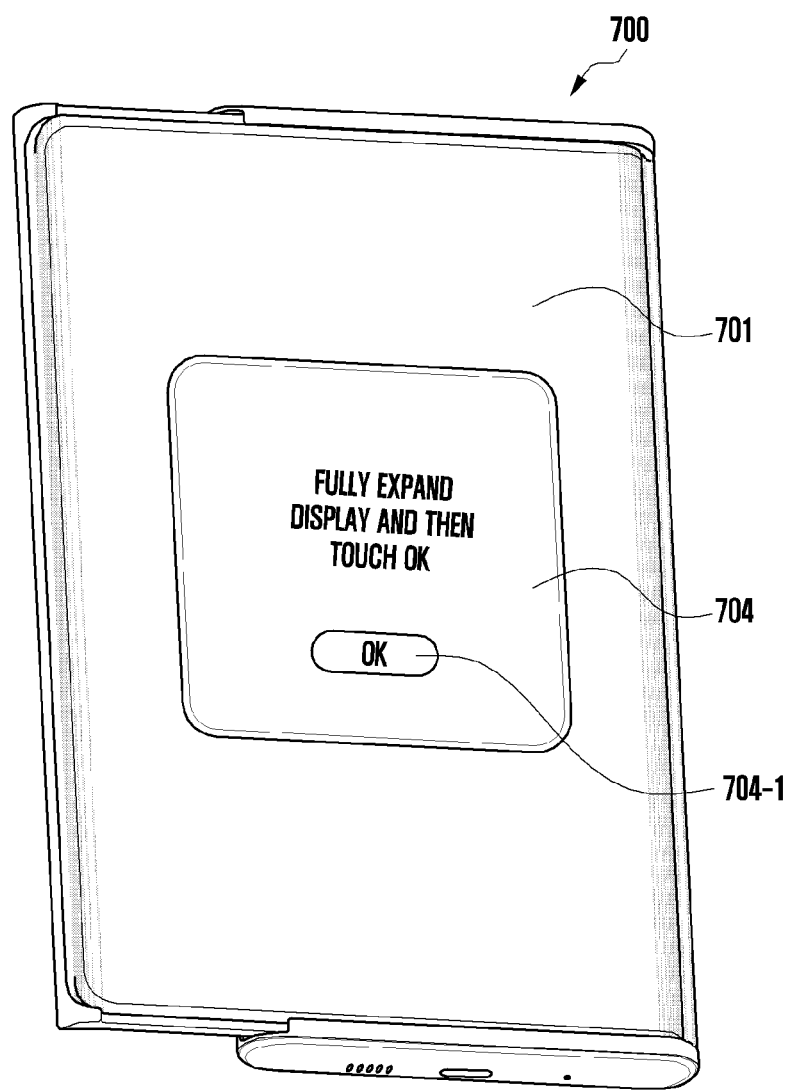

FIG. 7A illustrates a flowchart of calibration of a sensor and a magnetic member according to various embodiments. FIGS. 7B to 7D illustrate views showing a User Interface (UI) for calibration according to various embodiments.

According to various embodiments, a processor of an electronic device can store magnetic flux value changes detected through the sensor 210 while the relative position of a first part and a second part changes in the form of a table or a graph in a memory. The stored changes of a magnetic flux value may be used as reference data for determining necessity of calibration.

The following operations may be performed under the control of a processor (e.g., the processor 120 shown in FIG. 1) of an electronic device (e.g., the electronic device 101 shown in FIG. 1 or the electronic device 700 shown in FIGS. 7B to 7D). According to various embodiments, it is possible to compare a stored magnetic flux value change with a detected magnetic flux value change (710). It is possible to determine whether the difference between the stored magnetic flux value change and the detected magnetic flux value change exceeds a normal range (720). The normal range may be a value stored in the electronic device in advance by the manufacturer when the electronic device is assembled. The normal range may be freely changed in accordance with configuration by a user. When the difference exceeds the normal range, it is possible to compare the detected magnetic flux value change with a newly detected magnetic flux value change (730). It is possible to determine whether the difference between the detected magnetic flux value change and the newly detected magnetic flux value change exceeds the normal range (740). When the difference does not exceed the configured normal range, it is possible to delete the magnetic flux value change stored before and to store the detected magnetic flux value change (750). When the difference exceeds the configured normal range, calibration may be performed (760). As described above, when the stored magnetic flux value change and the detected magnetic flux value change do not coincide same, it is possible to newly detect a magnetic flux value change and compare the newly detected magnetic flux value change with the magnetic flux value change detected before. Accordingly, it is possible to identify whether the changed magnetic flux value change corresponds to a temporal detection error. When the newly detected magnetic flux value change coincides with the detected magnetic flux value change, it is possible to delete the stored magnetic flux value change and store the detected magnetic flux value change.

According to various embodiments, when the difference between the stored magnetic flux value change and the detected magnetic flux value change exceeds the normal range, a processor can determine that calibration is required and can display a User Interface (UI) 702 for starting calibration on a display 701 of an electronic device (e.g., the display device 160 shown in FIG. 1). Hereafter, calibration is described with reference to an example in which an electronic device 700 including a first part and a second part is a display 701 of which the display area is expanded by relative position of the first part and the second part.

According to various embodiments, a processor can display a first arrangement UI 703 on a display 701 such that the relative position of a second part to a first part is minimized. The first arrangement UI 703 may be a UI that induces a user such that the relative position of a second part to a first part is reduced so that the relative position of the second part to the first part is minimized. For example, as shown in FIG. 7C, the first arrangement UI 703 may be a UI including the text "insert display and then touch Ok". The first arrangement UI 703 may include a touch button 703-1 for a user to input that the display 701 has been fully inserted after fully inserting the display 701. The processor can recognize that the relative position of the second part to the first part is minimum by recognizing the touch input through the touch button 703-1. Next, the processor can display a second arrangement UI 704 on the display such that the relative position of the second part to the first part is increased so that the relative position of the second part to the first part is maximized. The second arrangement UI 704 may be a UI that induces a user such that the relative position of a second part to a first part is maximized. For example, as shown in FIG. 7D, the second arrangement UI 704 may be a UI including a text "fully expand display 701 and then touch Ok". The second arrangement UI 704 may include a touch button 704-1 for a user to input that the display 701 has been fully expanded after fully expanding the display 701. The processor can recognize that the relative position of the second part to the first part is maximum by recognizing the touch input through the touch button 704-1. The processor can store magnetic flux value changes detected through the sensor 210 while the relative position of the second part to the first part changes in the form of a table or a graph in a memory. This calibration may be repeated several times until the difference of detected magnetic flux value changes does not exceed the normal range.

Figure 8:
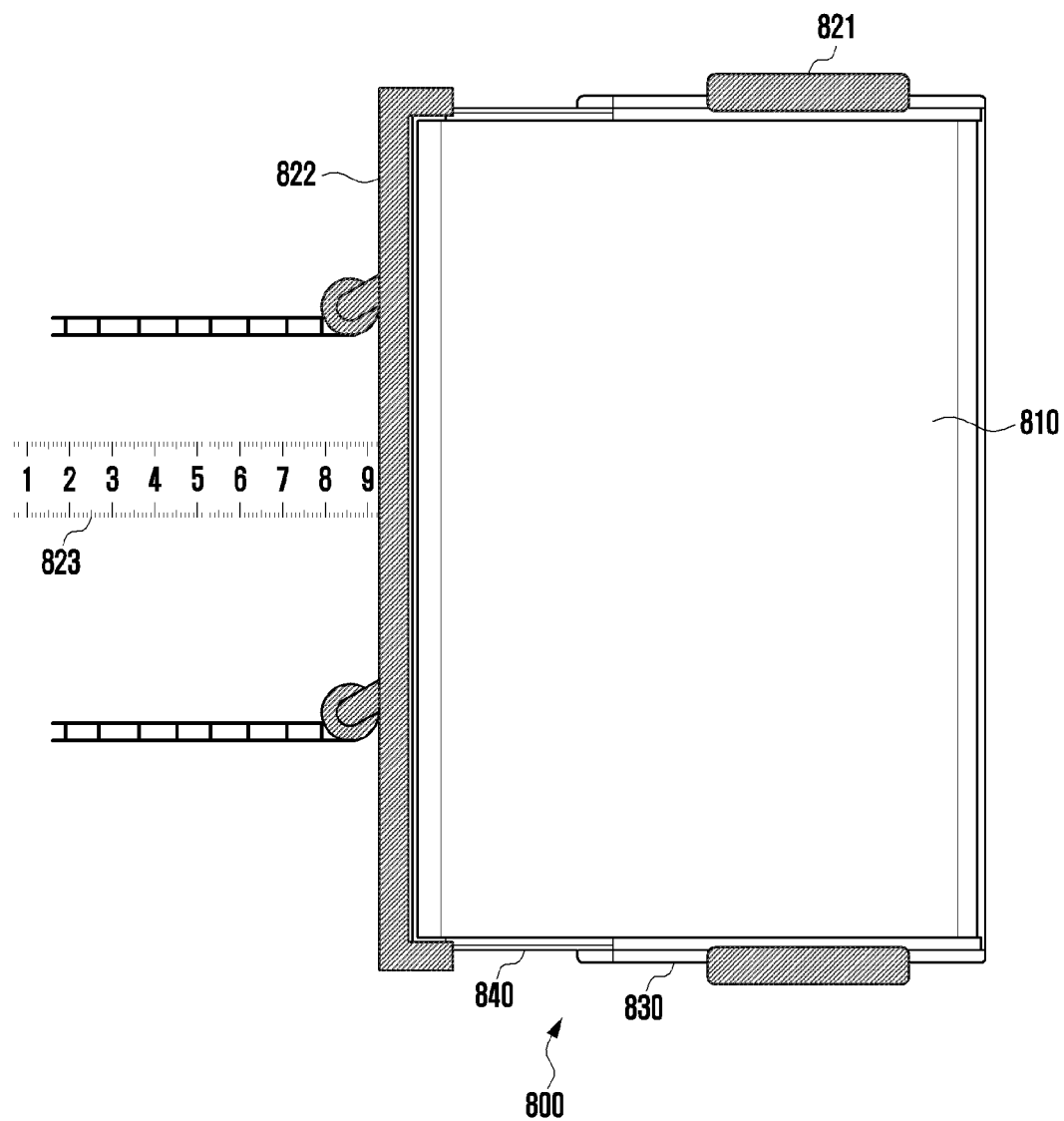
FIG. 8 illustrates a view showing calibration of an electronic device through a calibration device according to various embodiments.

FIG. 8 illustrates a view showing calibration of an electronic device through a calibration device according to various embodiments.

According to various embodiments, calibration of an electronic device may be performed through a specific device. Referring to FIG. 8, an electronic device 800 may include a first part 830 and a second part 840 installed to be movable with respect to the first part 830. The display area of a display 810 can be expanded by relative movement of the second part 840 to the first part 830.

According to various embodiments, the calibration device may include a fixer 821 that fixing the first part 830, a mover 822 coupled to the second part 840 and moving with the second part 840, and a measurer 823 measuring a movement distance of the mover 822. When the mover 822 coupled to the second part 840 is moved with the first part 830 fixed to the fixer 821, the second part 840 can move with respect to the first part 830. The movement distance of the mover 822 can be identified through the scale of the measurer 823. It is possible to identify the relative position of the second part 840 to the first part 830 from the movement distance of the mover 822. Magnetic flux detected by a sensor (e.g., the sensor 210 shown in FIG. 2) in accordance with the movement distance is stored in the form of a graph or a table, whereby calibration can be performed. Such calibration may be performed in the step of manufacturing the electronic device 800. In this case, the magnetic flux value according to the relative position of the second part 840 to the first part 830 stored through calibration may be used as the stored magnetic flux value change described with reference to FIG. 7A.

Figure 9:
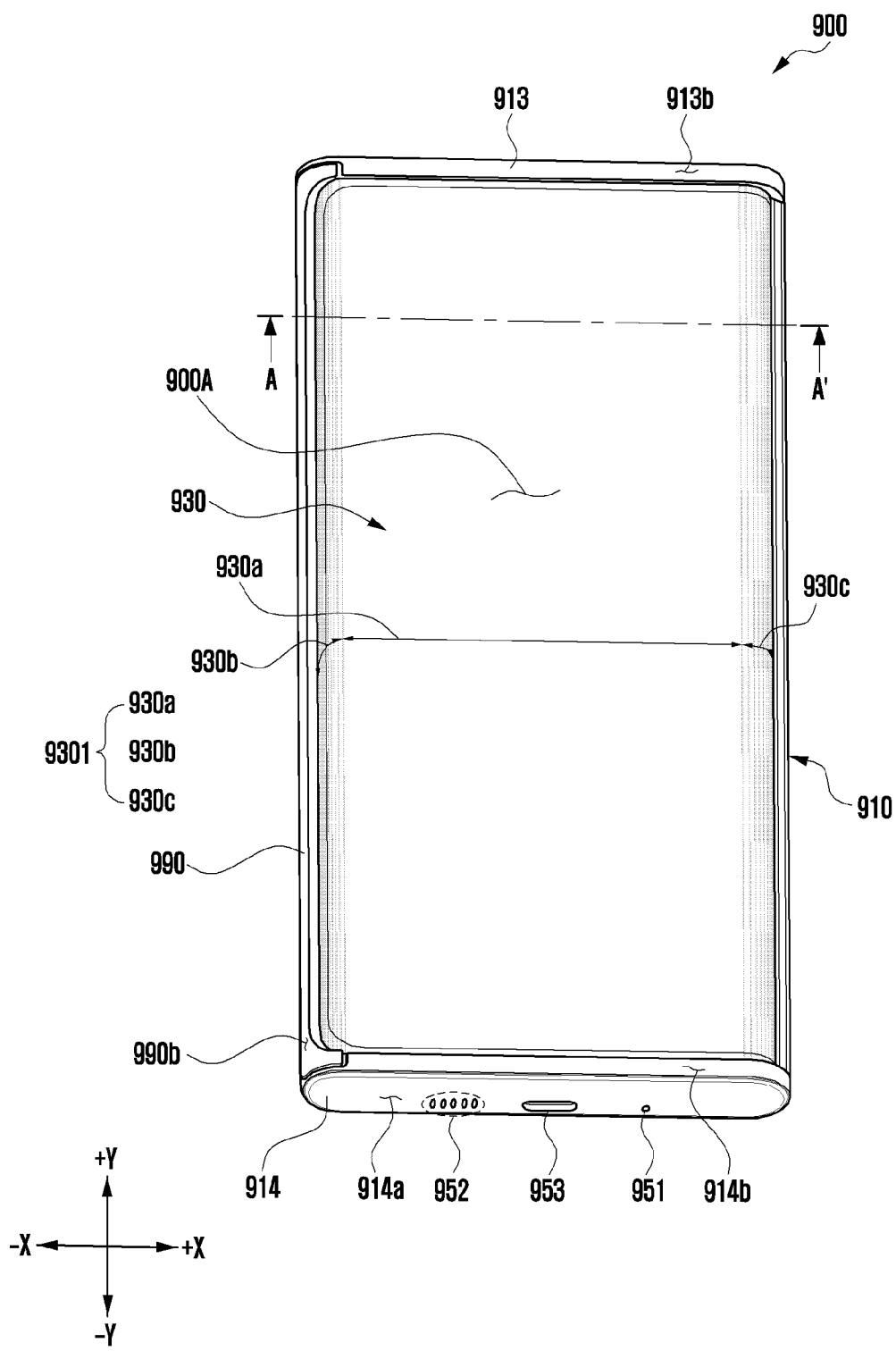
FIG. 9 illustrates a front perspective view showing an electronic device in a first state (e.g., a closed state) according to various embodiments.
Figure 10:
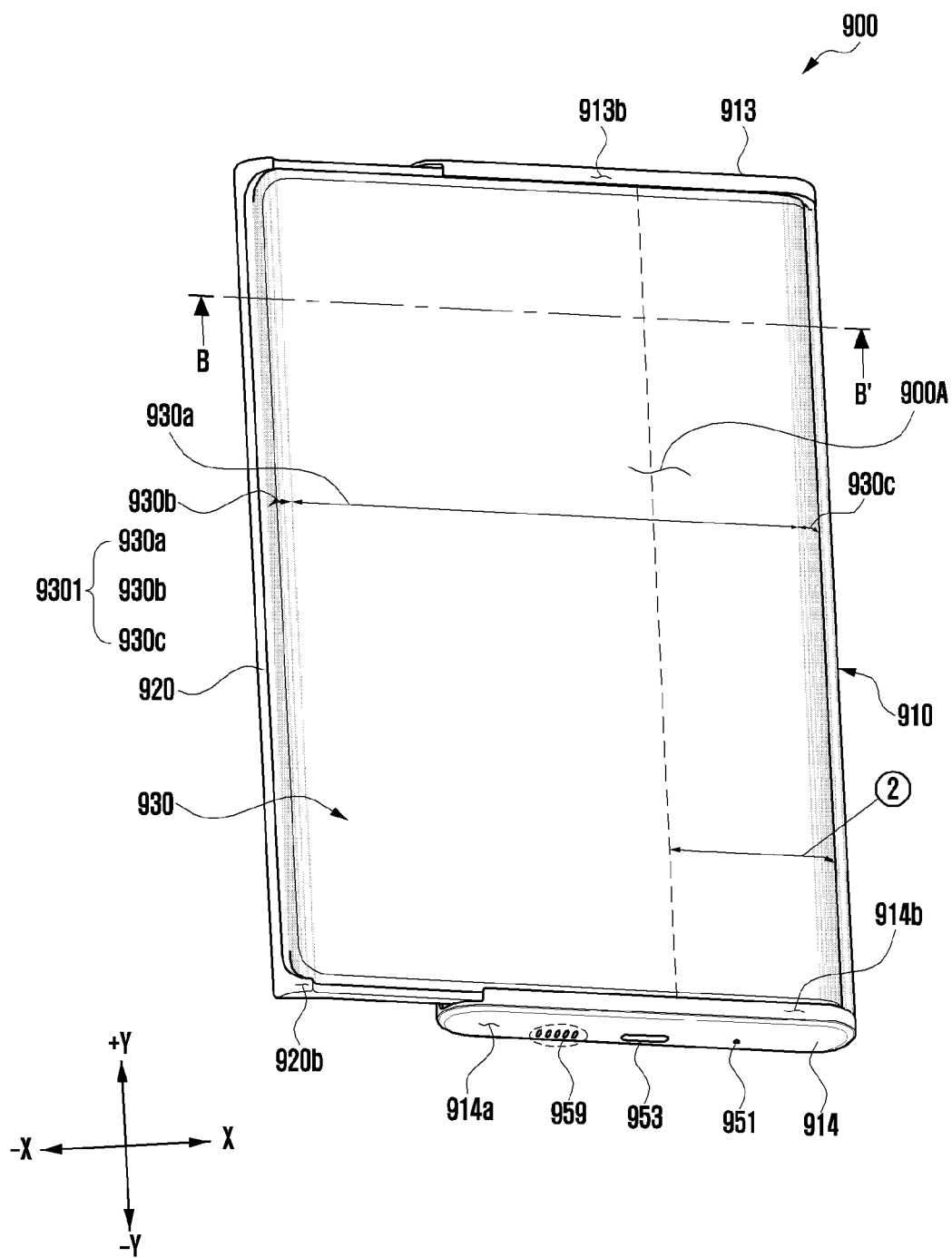
FIG. 10 illustrates a front perspective view showing an electronic device in a second state (e.g., an open state) according to various embodiments.
Figure 11:
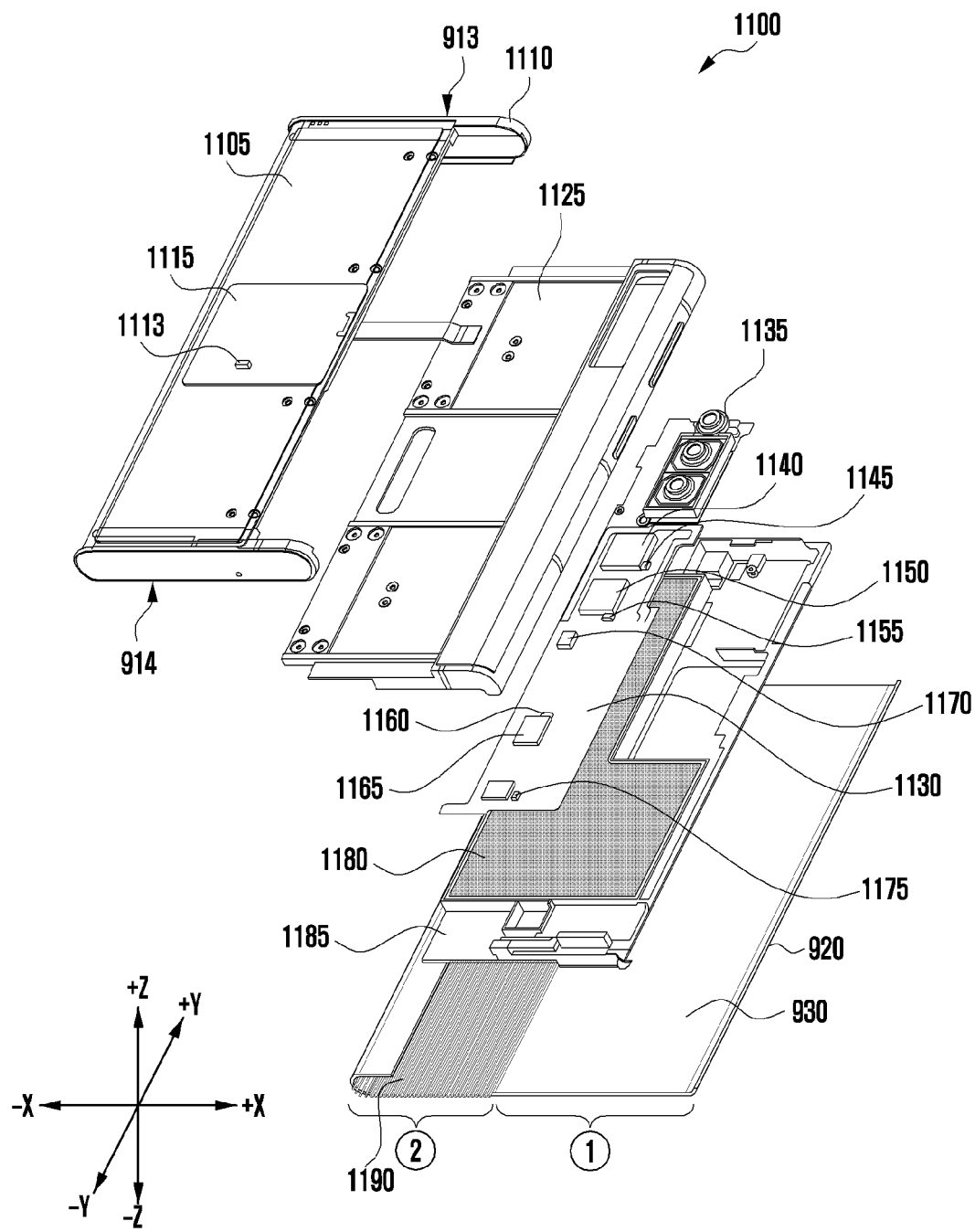
FIG. 11 illustrates an exploded perspective view showing the electronic device of FIG. 2 according to various embodiments of the disclosure.

FIG. 9 illustrates a front perspective view showing an electronic device in a first state (e.g., a closed state) according to various embodiments. FIG. 10 illustrates a front perspective view showing an electronic device in a second state (e.g., an open state) according to various embodiments. FIG. 11 illustrates an exploded perspective view showing the electronic device of FIG. 2 according to various embodiments of the disclosure.

According to various embodiments, the sensor (e.g., the sensor 210 shown in FIG. 2) described above and the magnetic member (e.g., the magnetic member 220 shown in FIG. 2) described above may be included in an electronic device (e.g., the electronic device 101 shown in FIG. 1) including a second part coupled to be able to slide with respect to a first part. FIGS. 9 to 11 show an example of such an electronic device. The second part can support a display (e.g., the display device 160 shown in FIG. 1) of the electronic device. The second part slides with respect to the first part, at least a portion of the display can be exposed out of the electronic device or inserted into the electronic device. For example, the first part may be the first support member 1185 or the second support member 1125 shown in FIG. 11. The second part may be the third support member 1105 shown in FIG. 11. Hereafter, an electronic device is described.

FIG. 9 illustrates a front perspective view showing an electronic device in a first state (e.g., a closed state) according to various embodiments. FIG. 10 illustrates a front perspective view showing an electronic device in a second state (e.g., an open state) according to various embodiments.

According to various embodiments, the electronic device 900 shown in FIGS. 9 and 10 may include the electronic device 101 shown in FIG. 1.

Referring to FIGS. 9 and 10, the electronic device 900 may be implemented such that the screen 9301 is expanded in a sliding type. For example, the screen 9301 may have an area, which is shown to the outside, of a flexible display 930.

In an embodiment, FIG. 9 shows the electronic device 900 without the screen 9301 expanded and FIG. 10 shows the electronic device 900 with the screen 9301 expanded. When the screen 9301 is not expanded, a sliding plate 920 for sliding motion of the flexible display 930 is not slid out, which may be referred to as a "first state" or a "closed state" hereafter. When the screen 9301 is expanded, the screen 9301 is maximally expanded not to further expand by slide-out of the sliding plate 920, which may be referred to as a "second state" or an "open state" hereafter.

In an embodiment, slide-out may be at least partial movement of the sliding plate 920 in a first direction (e.g., −X-axial direction) when the electronic device 900 is changed into the open state from the closed state. The open state may be defined as the state in which the screen 9301 has been expanded, in comparison to the closed state, and may provide the screen 9301 in various sizes, depending on the movement position of the sliding plate 920.

In various embodiments, the state of the electronic device 900 may include a "third state" or an "intermediate state". The intermediate state may refer to the state between the closed state shown in FIG. 9 and the open state shown in FIG. 10. The screen 9301 may include an active area, which is visually exposed such that images can be output, of the flexible display 930, and the electronic device 900 can adjust the active area in accordance with movement of the sliding plate 920 or movement of the flexible display 930. In the following description, the open state may refer to the state in which the screen 9301 has been maximally expanded. In various embodiments, the flexible display 930 slidably disposed in the electronic device 900 shown in FIG. 9 and providing the screen 9301 may be referred to as a "slide-out display" or an "expandable display".

In an embodiment, the electronic device 900 may include a sliding structure related to the flexible display 930. For example, when the flexible display 930 is moved a configured distance by an external force, the flexible display 930 can be changed into the open state from the closed state or into the closed state from the open state (e.g., semiautomatic sliding) by an elastic structure included in the sliding structure even if there is no more external force.

In another embodiment, when a signal is produced through an input device included in the electronic device, the electronic device 900 can be changed into the open state from the closed state or into the closed state from the open state by a driving device such as a motor connected with the flexible display 930. For example, when a signal is produced through a hardware button or a software button provided through a screen, the electronic device 900 can be changed into the open state from the closed state or into the closed state from the open state.

In another embodiment, when a signal is produced from various sensors such as a pressure sensor, the electronic device 900 can be changed into the open state from the closed state or into the closed state from the open state. For example, the electronic device 900 can detect, through a sensor, a squeeze gesture that presses a predetermined section of the electronic device 900 through a portion of a hand (e.g., a palm or a finger) when a user carries or holds the electronic device 900 with hand, and the electronic device 900 can be changed into the open state from the closed state or into the closed state from the open state in correspondence to the squeeze gesture.

In an embodiment, the flexible display 930 may have a bendable section ② (see FIG. 10). The bendable section ② may include an expanded portion of the screen 9301 when the electronic device 900 is changed into the open state from the closed state. When the electronic device 900 is changed into the open state from the closed state, the bendable section ② is drawn out of the internal space of the electronic device 900 like sliding, whereby the screen 9301 can be expanded. When the electronic device 900 is changed into the closed state from the open state, at least a portion of the bendable section ② is inserted into the internal space of the electronic device 900 like sliding, whereby the screen 9301 can be contracted. When the electronic device 900 is changed into the closed state from the open state, at least a portion of the bendable section ② may be moved into the internal space of the electronic device 900 while bending. For example, the flexible display 930 may include a flexible substrate (e.g., a plastic substrate) made of a polymer material including Polyimide (PI) or Polyester (PET).

In an embodiment, the electronic device 900 may include a housing 910, a sliding plate 920, and/or a flexible display 930.

In an embodiment, the housing (or case) 910 may include a back cover (not shown), a first side cover 913, or a second side cover 914. The back cover (not shown), the first side cover 913, or the second side cover 914 may be connected to a support member (not shown) disposed in the electronic device 900 and may form at least a portion of the external appearance of the electronic device 900.

In an embodiment, the back cover (not shown) may form at least a portion of the rear surface (not shown) of the electronic device 900. In an embodiment, the back cover (not shown) may be substantially transparent. For example, the rear cover may be made of coated or colored glass, ceramic, a polymer, metal (e.g., aluminum, stainless steel (STS), or magnesium), or a combination of at least two of these materials. In an embodiment, when the bendable section ② of the flexible display 930 is inserted in the internal space of the housing 910 (e.g., the closed state), at least a portion of the bendable section ② may be positioned to be seen from the external through the back cover (not shown). In this case, the back cover (not shown) may be made of a transparent material and/or a semi-transparent material.

In an embodiment, the first side cover 913 and the second side cover 914 may be disposed at opposite sides. For example, the first side cover 913 and the second side cover 914 may be disposed at opposite sides with the flexible display 930 therebetween in a second direction (e.g., Y-axial direction) perpendicular to a first direction (e.g., −X-axial direction) of slide-out of the sliding plate 920. The first side cover 913 may form at least a portion of a first side surface (not shown) of the electronic device 900 and the second side cover 914 may form at least a portion of a second side surface 914a of the electronic device 900, in which the second side surface 914a faces an opposite direction to the first side surface (not shown). The first side cover 913 may have a first edge 913b extending from the edge of the first side surface (not shown). For example, the first edge 913b may form at least a portion of a bezel of the electronic device 900. The second side cover 914 may have a second edge 914b extending from the edge of the second side surface 914a. For example, the second edge 914b may form at least a portion of another bezel of the electronic device 900. In an embodiment, in the closed state shown in FIG. 9, the surface of the first edge 913b, the surface of the second edge 914b, and the surface of the sliding plate 920 are smoothly connected, thereby forming a curved portion (not shown) corresponding to a first curved surface portion 930b of the screen 9301. In an embodiment, the surface of the first edge 913b or the surface of the second edge 914b may have another curved surface portion (not shown) corresponding to a second curved surface portion 930c, which is disposed opposite to the first curved surface portion 930b, of the screen 9301.

In an embodiment, the sliding plate 920 can slide on the support member (not shown) disposed in the electronic device 900. A least a portion of the flexible display 930 may be disposed on the sliding plate 920, and the closed state shown in FIG. 9 or the open state shown in FIG. 10 may be implemented based on the position of the sliding plate 920 on the support member (not shown). In an embodiment, the flexible display 930 may be attached to the sliding plate 920 through an adhesive member (not shown). In an embodiment, the adhesive member may include a thermal reactive adhesive member, an optical reactive adhesive member, a common adhesive, and/or a double-sided tape. In another embodiment, the flexible display 930 may be slid in a recess formed on the sliding plate 920, thereby being able to disposed and fixed on the sliding plate 920. The sliding plate 920 may serve to support at least a portion of the flexible display 930 and may be referred to as a display support structure.

In an embodiment, the sliding plate 920 may have a third edge 920b forming an outer surface of the electronic device 900 (e.g., a surface exposed to the outside and forming the external appearance of the electronic device 900). For example, the third edge 920b may form the bezel around the screen 9301 together with the first edge 913b and the second edge 914b in the closed state shown in FIG. 9. The third edge 920b may extend in a second direction (e.g., Y-axial direction) to connect an end of the first side cover 913 and an end of the second side cover 914 in the closed state. For example, in the closed state shown in FIG. 9, the surface of the third edge 920b may be smoothly connected with the surface of the first edge 913b and/or the surface of the second edge 914b.

In an embodiment, at least a portion of the bendable section ② is drawn out of the electronic device 900 by slide-out of the sliding plate 920, whereby the state (e.g., the open state) in which the screen 9301 has been expanded, as shown in FIG. 10, can be provided.

In an embodiment, the screen 9301 may have a flat surface portion 930a, and a first curved surface portion 930b and/or a second curved surface portion 930c disposed at opposite sides with the flat surface portion 930a therebetween in the closes state shown in FIG. 9. For example, the first curved surface portion 930b and the second curved surface portion 930c may be substantially symmetrical with the flat surface portion 930a therebetween. In an embodiment, when the closed state shown in FIG. 9 is changed into the open state shown in FIG. 10, the flat surface portion 930a can be expanded. For example, a partial area of the bendable section ② that forms the second surface 930c in the closed state shown in FIG. 9 may be included in the expanded flat surface portion 930a and may be formed as another area of the bendable section ② when the closed state shown in FIG. 9 is changed into the open state shown in FIG. 10.

In an embodiment, the electronic device 900 may include an opening (not shown) for drawing in or out the bendable section ② and/or a pulley (not shown) disposed in the opening (not shown). The pulley (not shown) may be positioned to correspond to the bendable section ②. The pulley (not shown) rotates when the closed state shown in FIG. 9 and the open state shown in FIG. 10 are switched, whereby movement and movement direction of the bendable section ② can be guided. The first curved surface portion 930b may be formed to correspond to a curved surface formed on a surface of the sliding plate 920. The second curved surface portion 930c may be formed by a portion corresponding to the curved surface of the pulley (not shown) in the bendable section ②. The first curved surface portion 930b is positioned opposite to the second curved surface portion 930c in the closed state or the open state of the electronic device 900, thereby being able to improve the aesthetic appearance of the screen 9301. In another embodiment, the electronic device 900 may be implemented with the flat surface portion 930a expanded without the first curved surface portion 930b.

In an embodiment, the flexible display 930 may further include a touch sensing circuit (e.g., a touch sensor). Though not shown, in various embodiments, the flexible display 930 may be coupled to or disposed close to a pressure sensor that can measure the intensity (pressure) of a touch and/or a digitizer that detects a magnetic field type of pen input device (e.g., a stylus pen). For example, the digitizer may include a coil member disposed on a dielectric substrate to be able to detect an electromagnetic induction type resonance frequency applied from a pen input device.

For example, the electronic device 900 may have a microphone hole 951 (e.g., the input device 150 shown in FIG. 1), a speaker hole 952 (e.g., the sound output device 155 shown in FIG. 1), and/or a connector hole 953 (e.g., the connection terminal 178 shown in FIG. 1). In an embodiment, the electronic device 900 may not include at least one of the components or may additionally include other components.

In an embodiment, the microphone hole 951 may be formed at at least a portion of the second side surface 914a to correspond to a microphone disposed in the electronic device 900. The position of the microphone hole 951 may be varied without being limited to the embodiment shown in FIG. 9. In an embodiment, the electronic device 900 may include a plurality of microphones that can detect the directions of sounds.

In an embodiment, the speaker hole 952 may be formed at at least a portion of the second side surface 914a to correspond to a speaker disposed in the electronic device 900. The position of the speaker hole 952 may be varied without being limited to the embodiment shown in FIG. 9. In an embodiment, the electronic device 900 may have a receiver hole for phone call. In an embodiment, the microphone hole 951 and the speaker hole 952 may be implemented in one hole, or the speaker hole 952 may not be provided like a piezo speaker.

In an embodiment, the connector hole 953 may be formed at at least a portion of the second side surface 914a to correspond to a connector (e.g., a USB connector) disposed in the electronic device 900. The electronic device 900 can transmit and/or receive power and/or data to and/or an external electronic device electrically connected with the connector through the connector hole 953. The position of the connector hole 953 may be varied without being limited to the embodiment shown in FIG. 9.

Though not shown, in various embodiments, the electronic device 900 may include a camera module (e.g., a front camera) that produces an image signal based on light received through a surface (e.g., a front surface 900A) of the electronic device 900 disposed in the direction that the screen 9301 faces. For example, the camera module (e.g., a front camera) (not shown) may be disposed in the housing 910 and aligned with an opening (e.g., a through-hole or a notch) formed in the flexible display 930. The camera module (e.g., a front camera) (not shown) can produce an image signal by receiving light through the opening and a partial area of a transparent cover overlapping the opening. The transparent cover serves to protect the flexible display 930 from the outside, and may include a substance such as polyimide or Ultra-Thin Glass (UTG).

In various embodiments, the camera module (e.g., a front camera)(not shown) may be disposed at the lower end of at least a portion of the screen 9301 of the flexible display 930 and can perform related functions (e.g., taking images) without the position thereof visually shown (or exposed). In this case, when the screen 9301 is seen from above, the camera module (e.g., a front camera)(not shown) is disposed to overlap at least a portion of the screen 9301, thereby being able to obtain images of an external subject without being exposed to the outside.

Though not shown, in various embodiments, the electronic device 900 may further include a key input device (e.g., the input device 150 shown in FIG. 1). The key input device may be disposed on a first side surface (not shown) of the electronic device 900 that is formed by the first side cover 913. In various embodiments, the key input device may include at least one sensor module.

Though not shown, in various embodiments, the electronic device 900 may include various sensor modules (e.g., the sensor module 176 shown in FIG. 1). The sensor module can produce an electrical signal or a data value corresponding to the internal operation state of the electronic device 900 or an external environmental state. For example, the sensor module may include a proximity sensor that produces a signal related to approach of an external object based on light received through the front surface 900A, which is disposed in the direction that the screen 9301 faces, of the electronic device 900. As another example, the sensor module may include various biosensors such as a fingerprint sensor or an HRM sensor that detects biological information based on light received through the front surface 900A or a rear surface (not shown) of the electronic device 900. The electronic device 900 may include at least one of various other sensor modules, for example, a gesture sensor, a gyro sensor, a barometer sensor, a magnetic sensor, an acceleration sensor, a grip sensor, a color sensor, an IR (Infrared) sensor, a biosensor, a temperature sensor, a humidity sensor, or an illumination sensor.

FIG. 11 illustrates an exploded perspective view showing the electronic device shown in FIG. 9 according to various embodiments (1100).

Referring to FIG. 11, the electronic device 900 may include a back cover (not shown), a first side cover 913, a second side cover 914, a first support member 1185, a second support member 1125, a third support member 1105, a sliding plate 920, a flexible display 930, a printed circuit board 1130 (e.g., a Flexible Printed Circuit Board (FPCB) or a Rigid-Flexible PCB (RFPCB), and/or a multi-bar structure (or a multi-bar assembly) 1190. Reference numerals described with reference to FIGS. 9 and 10 of the reference numerals shown FIG. 11 are not described.

In an embodiment, the first support member 1185, the second support member 1125, and/or the third support member 1105 are frame structures that can resist load, and can contribute to durability or strength of the electronic device 900. The first support member 1185, the second support member 1125, and/or the third support member 1105 may include a nonmetallic substance (e.g., polymer) or a metallic substance. A housing (e.g., the housing 910 shown in FIG. 9) including the back cover (not shown), the first side cover 913, or the second side cover 914, the sliding plate 920, the flexible display 930, the printed circuit board 1130, and the multi-bar structure 1190 may be disposed at or coupled to the first support member 1185, the second support member 1125, and/or the third support member 1105.

In an embodiment, the second support member 1125 may have a plate shape. The second support member 1125, for example, when seen in the −Z-axial direction, may have a plate shape overlapping at least a portion of the first support member 1185, or may be coupled to the first support member 1185 and/or the third support member 1105. The second support member 1125 may be disposed between the first support member 1185 and the third support member 1105. The third support member 1105 may be coupled to the first support member 1185 and/or the second support member 1125 with the second support member 1125 therebetween. The printed circuit board 1130 may be disposed on the second support member 1125 between the first support member 1185 and the second support member 1125. At least some of the first support member 1185, the second support member 1125, and/or the third support member 1105 may include a metallic substance and/or a nonmetallic substance (e.g., polymer).

In an embodiment, the sliding plate 920 may be disposed to be slidable on the first support member 1185. For example, a sliding structure that supports and guides coupling of the first support member 1185 and the sliding plate 920 or movement of the sliding plate 920 may be disposed between the first support member 1185 and the sliding plate 920. In an embodiment, the sliding structure may include at least one elastic structure (not shown). When the sliding plate 920 is moved a configured distance by an external force, the closed state shown in FIG. 9 may be changed into the open state shown in FIG. 10 or vice versa by the at least one elastic structure (not shown). For example, the at least one elastic structure (not shown) may include various elastic members such as a torsion spring. For example, the elastic structure 1101 is a torsion spring, the torsion spring may have a first end connected with the sliding plate 920, a second end connected with the first support member 1185, and a spring portion between the first end and the second end. When the sliding plate 920 is moved a configured distance in a first direction (e.g., the −X-axial direction) of slide-out by an external force, the position of the first end to the second end is changed, so the sliding plate 920 can be moved in the first direction by the elasticity of the spring portion even if there is no more elastic force, whereby the closed state shown in FIG. 9 can be changed into the open state shown in FIG. 10. When the sliding plate 920 is moved a configured distance in a second direction (e.g., the +X-axial direction), which is the opposite direction to the first direction, of slide-out by an external force, the position of the first end to the second end is changed, so the sliding plate 920 can be moved in the second direction by the elasticity of the spring portion even if there is no more elastic force, whereby the open state shown in FIG. 10 can be changed into the closed state shown in FIG. 9.

In an embodiment, the flexible display 930 may have a first section ① extending from the bendable section ②. The first section ① may be disposed on the sliding plate 920. When the closed state shown in FIG. 9 is changed into the open state shown in FIG. 10, the bendable section ② connected with the first section ① is moved out like sliding by movement of the sliding plate 920, whereby the screen (e.g., see the screen 9301 shown in FIG. 10) can be expanded. When the open state shown in FIG. 10 is changed into the closed state shown in FIG. 9, the bendable section ② is at least partially moved into the electronic device 900 by movement of the sliding plate 920, whereby the screen (e.g., see the screen 9301 shown in FIG. 9) can be contracted. In an embodiment, a pulley (not shown) may be positioned to correspond to the bendable section ②. The pulley (not shown) can be rotated by movement of the bendable section ② when the closed state shown in FIG. 9 and the open state shown in FIG. 10 are switched.

In an embodiment, in the closed state shown in FIG. 9 or the open state shown in FIG. 10, at least a portion of the multi-bar structure 1190 may be positioned to overlap the screen 9301 (e.g., seen FIG. 9 or FIG. 10) and may support the bendable section ② such that the bendable section ② of the flexible display 930 keep smoothly connected with the first section ① of the flexible display 930. The multi-bar structure 1190 can help the bendable section ② move while keeping smoothly connected with the first section ① when the closed state shown in FIG. 9 and the open state shown in FIG. 10 are switched.

In an embodiment, a camera module 1135 (e.g., the camera module 180 shown in FIG. 1), a charging circuit 1140 (e.g., the power management module 188 shown in FIG. 1), an Application Processor (AP) 1150 (e.g., the processor 120 shown in FIG. 1), a wireless communication circuit 1165, a sliding sensor 1170, an interface (e.g., the interface 177 shown in FIG. 1), and/or a memory (e.g., the memory 130 shown in FIG. 1) may be mounted on the printed circuit board 1130.

In an embodiment, the camera module 1135 (e.g., a rear camera) may be disposed to face the −Z-axial direction corresponding to the rear surface of the electronic device 900, and a portion (e.g., a lens) of the camera module 1135 may be visually exposed through a camera hole formed at the second support member 1125. The camera module 1135 may include one or more lenses, an image sensor, and/or an image signal processor. The camera module 1135 may include a plurality of camera modules. The electronic device 900 may include a plurality of camera modules (e.g., a dual camera or a triple camera) having different properties (e.g., angles of view) or functions. For example, a plurality of camera modules 1135 including lenses having different angles of view may be provided and the electronic device 900 can change the angles of view of the camera modules 1135 operated in the electronic device 900 based on selection of a user. A plurality of camera modules may include at least one of a wide angle camera, a telephoto camera, a color camera, a monochrome camera, or an Infrared (IR) camera (e.g., a Time of Flight (TOF) camera, structured light camera). In an embodiment, the IR camera may operate as at least a portion of a sensor module (not shown).

In an embodiment, the charging circuit 1140 may be electrically connected with a wireless power reception circuit 1115 and/or an interface (e.g., a USB connector (not shown)). The charging circuit 1140 can receive power transmitted from a charging device (not shown) through the wireless power reception circuit 1115 or a USB connector and can supply power to a battery 1180. In an embodiment, the charging circuit 1140 may be electrically connected with other components of the electronic device 900 and may supply power to other components of the electronic device 900. In an embodiment, the charging circuit 1140 may be referred to as a PMIC or a charger.

In an embodiment, at least one temperature sensor may be mounted on the printed circuit board 1130. For example, the at least one temperature sensor may be disposed in areas respectively close to the charging circuit 1140, the AP 1150, the wireless communication circuit 1165, and the interface. In an embodiment, the at least one temperature sensor may be disposed on the third support member 1105.

At least one temperature sensor according to various embodiments may include first to fifth temperature sensors. However, the disclosure is not limited thereto.

For example, the first temperature sensor 1113 may be disposed in an area close to the wireless power reception circuit 1115. The first temperature sensor 1113 can detect a temperature change of the wireless power reception circuit 1115. As another example, the second temperature sensor 1145 may be disposed in an area close to the charging circuit 1140. The second temperature sensor 1145 can detect a temperature change of the charging circuit 1140. As another example, the third temperature sensor 1155 may be disposed in an area close to the AP 1150 and can detect a temperature change of the AP 1150. As another example, the fourth temperature sensor 1160 may be disposed in an area close to the wireless communication circuit 1165 and can detect a temperature change of the wireless communication circuit 1165. As another example, the fifth temperature sensor 1175 may be disposed in an area close to the interface (e.g., a USB connector) and can detect a temperature change of the interface.

In an embodiment, the sliding sensor 1170 may include a sensor that detects the degree of slide-out of the flexible display 930 from the housing 910 (e.g., detect the first state, the second state, and the third state). For example, the sliding sensor 1170 may include a magnetic force sensor that senses a magnetic force that varies in accordance with the distance from a magnetic substance (e.g., a magnet) disposed on the printed circuit board 1130.

In an embodiment, the interface may include a High Definition Multimedia Interface (HDMI), a Universal Serial Bus (USB) interface, an SD card interface, and/or an audio interface. The interface can electrically or physically connect the electronic device 900 to external electronic devices and may include an USB connector, an SD card/MMC connector, or an audio connector.

In an embodiment, the memory may include a volatile memory or a nonvolatile memory.

In an embodiment, the electronic device 900 may include various other components disposed on the printed circuit board 1130 or electrically connected with the printed circuit board 1130. For example, the electronic device 900 may include a battery 1180 disposed between the first support member 1185 and the second support member 1125 or between the second support member 1125 and the third support member 1105. The battery 1180, which is a device for supplying power to one or more components of the electronic device 900, for example, may include a primary battery that is not rechargeable, a secondary battery that is rechargeable, or a fuel cell. The battery 1180 may be integrally disposed in the electronic device 900 or may be detachably attached to the electronic device 900.

In an embodiment, the electronic device 900 may include an antenna disposed between the first support member 1185 and the second support member 1125 or between the second support member 1125 and the third support member 1105. For example, the antenna may include a Near Field Communication (NFC) antenna, a wireless charging antenna, and/or a Magnetic Secure Transmission (MST) antenna. The antenna can perform near field communication with external devices or can wirelessly transmit and receive power for charging. In an embodiment, the antenna 1110 may be formed by a portion or a combination of the first side cover 913 and/or the second side cover 914.

Figure 12A:
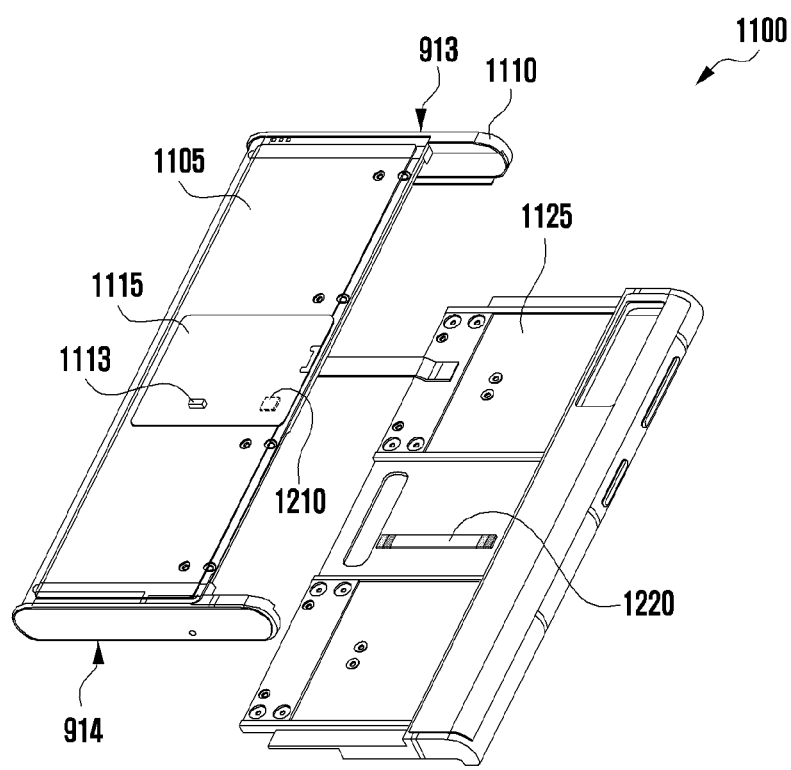
FIGS. 12A and 12B illustrate views showing an embodiment in which a sensor and a magnetic member are disposed in the electronic device shown in FIGS. 9 to 11.
Figure 12B:
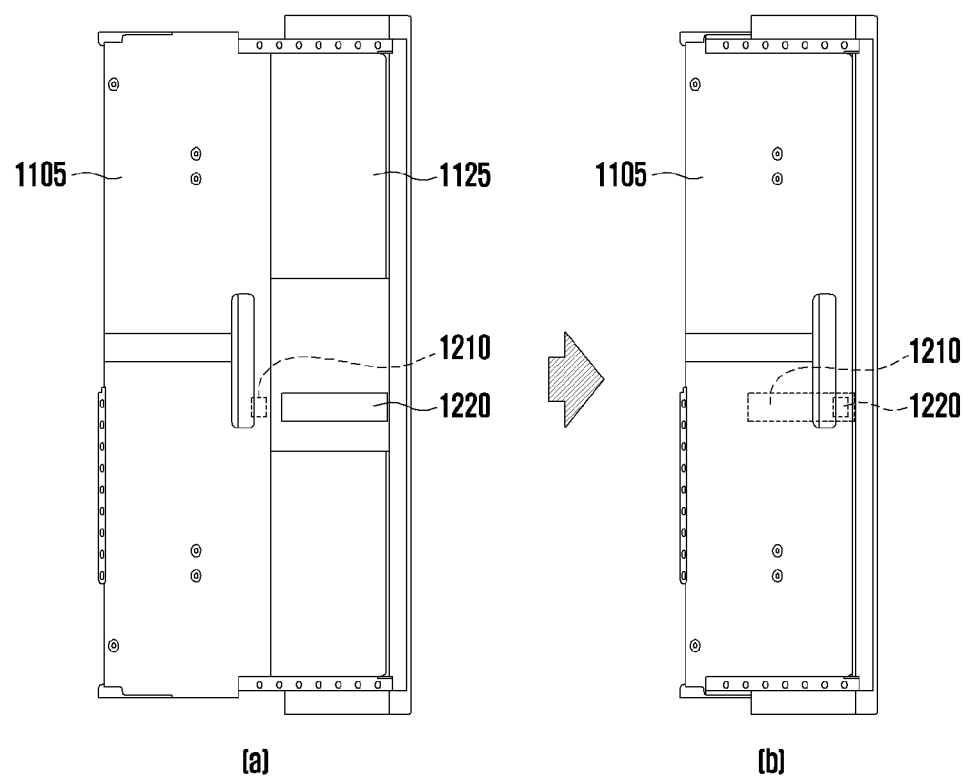

FIGS. 12A and 12B illustrate views showing an embodiment in which a sensor and a magnetic member are disposed in the electronic device shown in FIGS. 9 to 11.

According to various embodiments, a magnetic member 1220 (e.g., the magnetic member 220 shown in FIG. 2) may be disposed on the second support member 1125. A sensor 1210 (e.g., the sensor 210 shown in FIG. 2) may be disposed on the third support member 1105 at a position opposite to the magnetic member 1220. In an embodiment, a groove corresponding to the shape of the magnetic member 1220 may be formed at the second support member 1125 and the magnetic member 1220 may be inserted in the groove formed at the second support member 1125 and disposed on the second support member 1125.

According to various embodiments, the length of the magnetic member 1220 (e.g., the magnetic member 220 shown in FIG. 2) may be larger than or the same as the distance that the third support member 1105 slides with respect to the second support member 1125. For example, assuming that the distance when the third support member 1105 minimally slides with respect to the second support member 1125 (e.g., does not slide) is 0 and the distance when it maximally slides is dx, the length of the magnetic member 1220 may be larger than or the same as dx.

According to various embodiments, the length of the groove formed at the second support member 1125 may be larger than or the same as the length that the third support member 1105 slides with respect to the second support member 1125. For example, assuming that the distance when the third support member 1105 minimally slides with respect to the second support member 1125 (e.g., does not slide) is 0 and the distance when it maximally slides is dx, the length of the groove formed at the second support member 1125 may be larger than or the same as dx.

As shown in FIG. 12B, as the third support member 1105 slides with respect to the second support member 1125, the relative position of the sensor 1210 and the magnetic member 1220 may change. In accordance with the change of the relative position of the sensor 1210 and the magnetic member 1220, as shown in FIG. 3, a magnetic flux value change can be detected by the sensor 1210.

An electronic device according to various embodiments may include: a first part; a second part configured to move with respect to the first part; a magnetic member disposed on one of the first part and the second part; and a sensor disposed on the other one of the first part and the second part and facing the magnetic member, in which the magnetic member may have a body extending in a movement direction of the second part and magnets respectively disposed at both ends of the magnetic member such that different polarities are close to each other.

The body of the magnetic member may be a magnetic substance.

The body of the magnetic member may be formed such that the thickness of the center portion is smaller than the thickness at both ends where the magnets are disposed.

The body of the magnetic member may be formed such that the thickness gradually decreases from both ends where the magnets are disposed toward a center portion.

The body of the magnetic member may be made of different materials at a first section close to both ends where the magnets are disposed and a second section excluding the first section.

Magnetic permeability of the material of the first section may be lower than magnetic permeability of the material of the second section in the body of the magnetic member.

The body of the magnetic member may have a plurality of slits that are openings formed longitudinally with predetermined intervals.

The electronic device may further include a processor operatively connected with the sensor, in which the processor may determine a relative position of the second part to the first part using a magnetic flux value detected by the sensor.

The electronic device may further include a processor operatively connected with the sensor, in which the processor may determine a relative position of the second part to the first part by recognizing peaks of a magnetic flux value detected by the sensor using the slits formed at the body of the magnetic member.

The processor may store a change of a magnetic flux value detected by the sensor in accordance with movement of the second part to the first part into a memory, may compare the stored change of a magnetic value with a change of a magnetic flux value detected by the sensor in accordance with movement of the second part to the first part, and may display a User Interface (UI) for starting calibration on a display of the electronic device, based on the comparison result.

The processor may display a first arrangement UI on the display such that the relative position of the second part to the first part becomes minimum, may display a second arrangement UI on the display such that the relative position of the second part to the first part becomes maximum, and may store a change of a magnetic flux value detected by the sensor while the relative position of the second part to the first part becomes the maximum from the minimum into the memory.

The second part may move by sliding with respect to the first part and the second part may support the display of the electronic device, whereby at least a portion of the display may be exposed out of the electronic device or inserted in the electronic device by sliding of the second part.

A method for determining a relative position between parts according to various embodiments may include: detecting a magnetic flux value through a sensor disposed on one of a first part and a second part to face a magnetic member disposed on the other one of the first part and the second part; and determining a relative position of the second part to the first part using the detected magnetic flux value, in which the magnetic member may have a body extending in a movement direction of the second part and magnets respectively disposed at both ends of the magnetic member such that different polarities are close to each other.

The method may further include storing a magnetic flux value detected by the sensor in accordance with the relative position of the second part to the first part, in which the determining of a relative position of the second part to the first part may be performed by comparing the stored magnetic flux value with the detected magnetic flux value.

The method may further include performing calibration based on a difference between the stored magnetic flux value and the detected magnetic flux value, in which the calibration may include: displaying a first arrangement UI on the display such that the relative position of the second part to the first part becomes minimum; displaying a second arrangement UI on the display such that the relative position of the second part to the first part becomes maximum; and storing a change of a magnetic flux value detected by the sensor while the relative position of the second part to the first part becomes the maximum from the minimum into the memory.

The body of the magnetic member may have a plurality of slits that are openings formed longitudinally with predetermined intervals, and the determining of a relative position of the second part to the first part may be performed by recognizing peaks of a magnetic flux value detected by the sensor using the slits formed at the body of the magnetic member.

A sensor device according to various embodiments may include: a magnetic member disposed on one of a first part and a second part configured to be movable with respect to the first part; and a sensor disposed on the other one of the first part and the second part and facing the magnetic member, in which the magnetic member may have a body extending in a movement direction of the second part and magnets respectively disposed at both ends of the magnetic member such that different polarities are close to each other.

The body of the magnetic member may be a magnetic substance.

The body of the magnetic member may be formed such that the thickness gradually decreases from both ends where the magnets are disposed toward a center portion.

The body of the magnetic member may have a plurality of slits that are openings formed longitudinally with predetermined intervals.

Further, the embodiments described and shown in the specification and the drawings are specific examples for easily explaining the disclosure and helping understand an embodiment the disclosure and do not limit the scope of the disclosure. Therefore, other than the embodiments described herein, all of changes or modifications based on the spirit of the disclosure should be construed as being included in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first part;
   a second part configured to move with respect to the first part;
   a magnetic member physically coupled to only one of the first part or the second part; and
   a sensor configured to detect a magnetic flux value and physically coupled to the first part, when the magnetic member is physically coupled to the second part, or the second part, when the magnetic member is physically coupled to the first part, such that the sensor is facing the magnetic member,
   a processor operatively connected with the sensor,
   wherein the magnetic member includes a body extending in a movement direction of the second part and two magnets respectively physically coupled to opposite ends of the body such that a north pole of one of the magnets is adjacent to the body and a south pole of the other of the magnets is adjacent to the body,
   wherein the body of the magnetic member includes a plurality of slits that are openings formed longitudinally with predetermined intervals,
   wherein the body of the magnetic member is magnetized by the two magnets,
   wherein the sensor detects the magnetic flux value induced in the body and the two magnets of the magnetic member, and
   wherein the processor is configured to determine a relative position of the second part to the first part by recognizing peaks of the magnetic flux value detected by the sensor using the slits formed at the body of the magnetic member.

2. The electronic device of claim 1, wherein the body of the magnetic member is a magnetic substance.

3. The electronic device of claim 1, wherein the body of the magnetic member is formed such that a thickness of a center portion is smaller than a thickness at both of the ends of the magnetic member where the magnets are disposed.

4. The electronic device of claim 1, wherein the body of the magnetic member is formed such that a thickness gradually decreases from both of the ends of the magnetic member where the magnets are disposed toward a center portion.

5. The electronic device of claim 1, wherein the body of the magnetic member is made of different materials at a first section close to both of the ends of the magnetic member where the magnets are disposed and a second section excluding the first section.

6. The electronic device of claim 5, wherein magnetic permeability of a material of the first section is lower than magnetic permeability of a material of the second section in the body of the magnetic member.

7. The electronic device of claim 1,
wherein the processor is configured to determine a relative position of the second part to the first part using the magnetic flux value detected by the sensor.

8. The electronic device of claim 7, wherein the processor is further configured to:
store a change of the magnetic flux value detected by the sensor in accordance with movement of the second part to the first part into a memory,
compare the stored change of a magnetic value with a change of the magnetic flux value detected by the sensor in accordance with movement of the second part to the first part, and
display a user interface (UI) for starting calibration on a display of the electronic device, based on the comparison.

9. The electronic device of claim 8, wherein the processor is further configured to:
display a first arrangement UI on the display such that the relative position of the second part to the first part is reduced,
display a second arrangement UI on the display such that the relative position of the second part to the first part is increased, and
store a change of the magnetic flux value detected by the sensor while the relative position of the second part to the first part becomes is increased into the memory.

10. The electronic device of claim 1, wherein:
the second part moves by sliding with respect to the first part, and
the second part supports a display of the electronic device, whereby at least a portion of the display is exposed out of the electronic device or inserted in the electronic device by sliding of the second part.

11. A method for determining a relative position between parts, the method comprising:
detecting a magnetic flux value through a sensor physically coupled to only one of a first part or a second part such that the sensor faces a magnetic member physically coupled to the first part, when the sensor is physically coupled to the second part, or the second part, when the sensor is physically coupled to the first part; and
determining a relative position of the second part to the first part using the detected magnetic flux value,
wherein the magnetic member includes a body extending in a movement direction of the second part and two magnets respectively physically coupled to opposite ends of the body such that a north pole of one of the magnets is adjacent to the body and a south pole of the other of the magnets is adjacent to the body,
wherein the body of the magnetic member includes a plurality of slits that are openings formed longitudinally with predetermined intervals,
wherein the body of the magnetic member is magnetized by the two magnets, and
wherein the sensor detects the magnetic flux value induced in the body and the two magnets of the magnetic member, and
wherein determining the relative position of the second part to the first part comprises recognizing peaks of the magnetic flux value detected by the sensor using the slits formed at the body of the magnetic member.

12. The method of claim 11, further comprising storing the magnetic flux value detected by the sensor in accordance with the relative position of the second part to the first part,
wherein determining the relative position of the second part to the first part is based on a comparison of the stored magnetic flux value with the detected magnetic flux value.

13. The method of claim 12, further comprising performing a calibration based on a difference between the stored magnetic flux value and the detected
magnetic flux value,
wherein the calibration includes:
displaying a first arrangement UI on a display such that the relative position of the second part to the first part is reduced;
displaying a second arrangement UI on the display such that the relative position of the second part to the first part is increased; and
storing a change of the magnetic flux value detected by the sensor while the relative position of the second part to the first part is increased into a memory.

14. A sensor device comprising:
a magnetic member physically coupled to only one of a first part or a second part configured to be movable with respect to the first part; and
a sensor configured to detect a magnetic flux value and physically coupled to the first part, when the magnetic member is coupled to the second part, or the second part, when the magnetic member is physically coupled to the first part, such that the sensor is facing the magnetic member,
wherein the magnetic member includes a body extending in a movement direction of the second part and two magnets respectively physically coupled to opposite ends of the body such that a north pole of one of the magnets is adjacent to the body and a south pole of the other of the magnets is adjacent to the body,
wherein the body of the magnetic member includes a plurality of slits that are openings formed longitudinally with predetermined intervals,
wherein the body of the magnetic member is magnetized by the two magnets, and
wherein the sensor detects the magnetic flux value induced in the body and the two magnets of the magnetic member.

15. The sensor device of claim 14, wherein the body of the magnetic member is a magnetic substance.

16. The sensor device of claim 14, wherein the body of the magnetic member is formed such that a thickness gradually decreases from both of the ends of the magnetic member where the magnets are disposed toward a center portion.

* * * * *